(12) United States Patent
Kaye, Jr.

(10) Patent No.: US 12,434,359 B2
(45) Date of Patent: Oct. 7, 2025

(54) MODULAR TOOL BIT HOLDER SYSTEM

(71) Applicant: BLACK & DECKER INC., New Britain, CT (US)

(72) Inventor: Thomas R. Kaye, Jr., Bel Air, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/938,782

(22) Filed: Oct. 7, 2022

(65) Prior Publication Data

US 2023/0101161 A1  Mar. 30, 2023

Related U.S. Application Data

(63) Continuation of application No. 16/858,896, filed on Apr. 27, 2020, now Pat. No. 11,534,897.

(60) Provisional application No. 62/845,363, filed on May 9, 2019.

(51) Int. Cl.
  *B25B 23/00* (2006.01)
  *B25F 3/00* (2006.01)

(52) U.S. Cl.
  CPC ...... *B25B 23/0021* (2013.01); *B25B 23/0035* (2013.01); *B25F 3/00* (2013.01)

(58) Field of Classification Search
  USPC ........................ 81/177.1, 177.2, 177.6, 57.13
  See application file for complete search history.

(56) References Cited

U.S. PATENT DOCUMENTS

| 2,637,233 | A | * | 5/1953 | Hoffman | ................ B25B 23/00 81/448 |
| 3,724,561 | A | | 4/1973 | Merrels | |
| 4,103,511 | A | * | 8/1978 | Kress | ........................ B25F 3/00 464/178 |

(Continued)

FOREIGN PATENT DOCUMENTS

| DE | 3545705 A1 | 6/1987 |
| DE | 102014207713 A1 | 10/2015 |
| GB | 884593 | 12/1961 |

OTHER PUBLICATIONS

Extended European Search Report, EP Application No. 20173392, Oct. 23, 2020, 8 pages, EPO.

(Continued)

*Primary Examiner* — David S Posigian
*Assistant Examiner* — Dana Lee Poon
(74) *Attorney, Agent, or Firm* — Scott B. Markow

(57) ABSTRACT

A modular tool bit holder system includes an angle tool bit holder, a flexible shaft tool bit holder. The angle tool bit holder includes a housing containing a first input shaft, a first angle gear rotatably drivable about a first axis, a second angle gear, and a first bit holder rotatably drivable by the first angle gear about a second axis at an angle to the first axis. The flexible shaft tool bit holder includes a second input shaft, a flexible intermediate shaft rotatably drivable by the second input shaft, and a second tool bit holder rotatably drivable by the flexible intermediate shaft. The angle tool bit holder and the flexible shaft tool bit holder are operable separately or in combination. A connection assembly is configured to non-rotatably couple the angle tool bit holder and the flexible shaft tool bit holder when they are operable in combination.

18 Claims, 27 Drawing Sheets

(56) References Cited

U.S. PATENT DOCUMENTS

| | | | |
|---|---|---|---|
| 4,913,007 A | 4/1990 | Reynolds | |
| 5,172,612 A | 12/1992 | Hansson | |
| D337,251 S * | 7/1993 | Miller | D8/61 |
| 5,641,238 A | 6/1997 | Oswald | |
| 5,709,136 A * | 1/1998 | Frenkel | B25B 23/0021 |
| | | | 81/57.13 |
| 5,741,084 A | 4/1998 | Del Rio et al. | |
| 5,863,159 A | 1/1999 | Lasko | |
| 5,888,200 A | 3/1999 | Walen | |
| 5,941,891 A | 8/1999 | Walen | |
| 5,988,957 A | 11/1999 | Wheeler | |
| 6,055,887 A | 5/2000 | Galat | |
| 6,261,035 B1 | 7/2001 | Moores, Jr. et al. | |
| 6,293,172 B1 | 9/2001 | Smith | |
| 6,463,824 B1 | 10/2002 | Prell et al. | |
| 6,790,144 B2 | 9/2004 | Talesky | |
| 6,821,048 B2 | 11/2004 | Talesky | |
| 6,929,266 B2 | 8/2005 | Peters et al. | |
| 6,952,986 B2 * | 10/2005 | Fu | B25G 1/025 |
| | | | 81/177.2 |
| 7,086,813 B1 | 8/2006 | Boyle et al. | |
| 7,581,470 B1 | 9/2009 | Huang | |
| D636,245 S | 4/2011 | Adkins | |
| 7,997,169 B1 | 8/2011 | Hack | |
| D665,644 S | 8/2012 | McRoberts et al. | |
| D692,742 S | 11/2013 | Wenchel | |
| 8,695,725 B2 | 4/2014 | Lau et al. | |
| 8,707,816 B2 * | 4/2014 | Adkins | B23B 45/003 |
| | | | 74/416 |
| 9,085,077 B2 | 7/2015 | Lau et al. | |
| 9,314,848 B2 | 4/2016 | Larsson | |
| 9,314,852 B2 * | 4/2016 | Santamarina | B23B 31/06 |
| 9,352,455 B2 | 5/2016 | Steele et al. | |
| 9,414,848 B2 | 8/2016 | Edwards et al. | |
| 9,504,478 B2 | 11/2016 | Edwards et al. | |
| 10,150,205 B2 | 12/2018 | Santamarina et al. | |
| 10,780,558 B2 * | 9/2020 | Dougherty | B25G 1/02 |
| 11,065,743 B2 * | 7/2021 | Chiang | B25B 23/0021 |
| 2006/0169090 A1 * | 8/2006 | Kozak | B25B 23/0021 |
| | | | 74/500.5 |
| 2008/0317559 A1 | 12/2008 | White et al. | |
| 2011/0083534 A1 * | 4/2011 | Kozak | B25G 1/025 |
| | | | 81/177.85 |
| 2012/0204685 A1 * | 8/2012 | Marson | B25B 23/0035 |
| | | | 81/184 |
| 2013/0008677 A1 | 1/2013 | Huifu | |
| 2014/0202289 A1 | 7/2014 | Huang | |
| 2015/0273669 A1 | 10/2015 | Dougherty | |
| 2016/0116023 A1 | 4/2016 | Eisinger et al. | |
| 2016/0332286 A1 | 11/2016 | Chiang | |

OTHER PUBLICATIONS

Extended European Search Report, EP Application No. 22216464, Mar. 29, 2023, 5 pages, EPO.

* cited by examiner

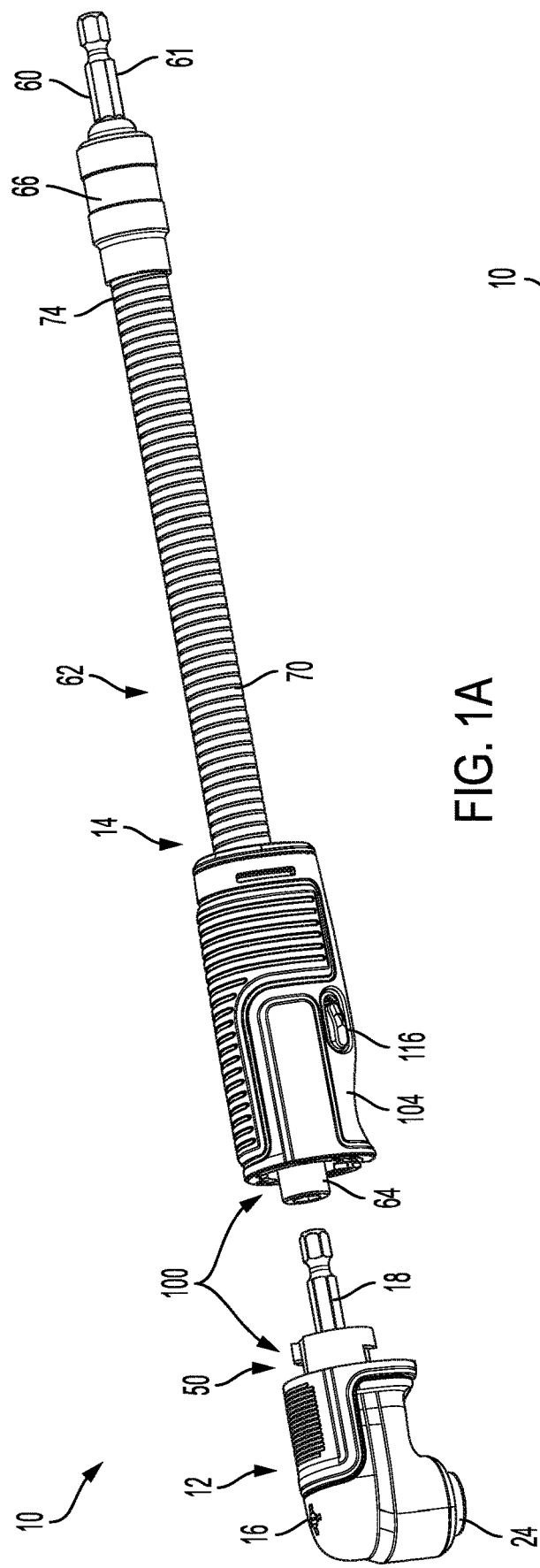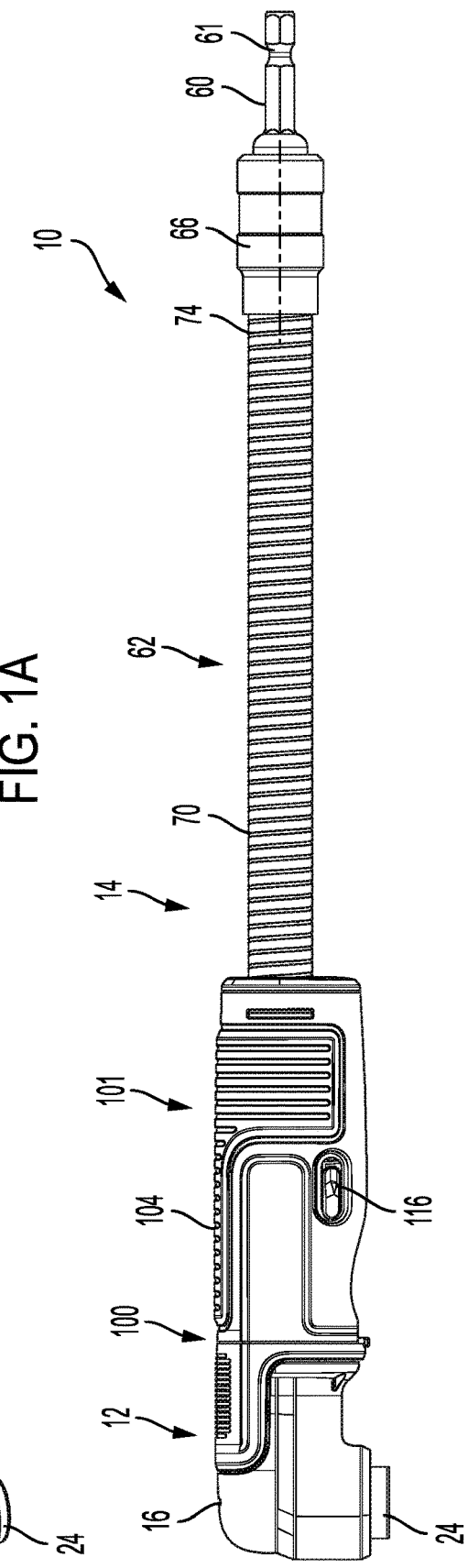

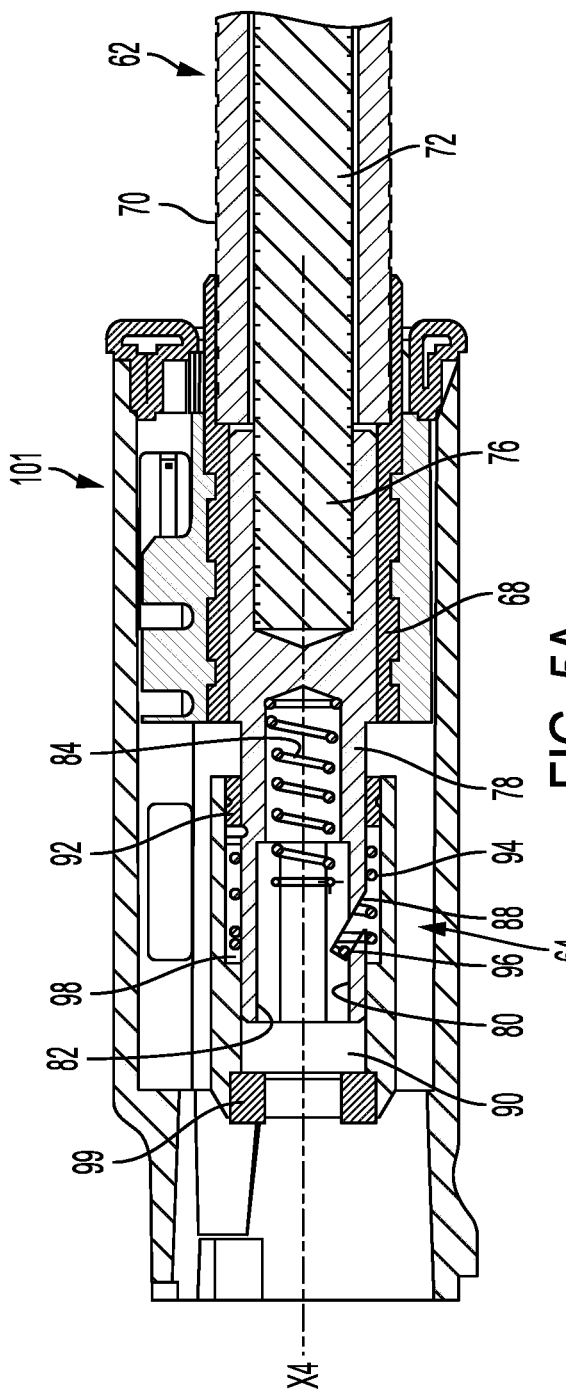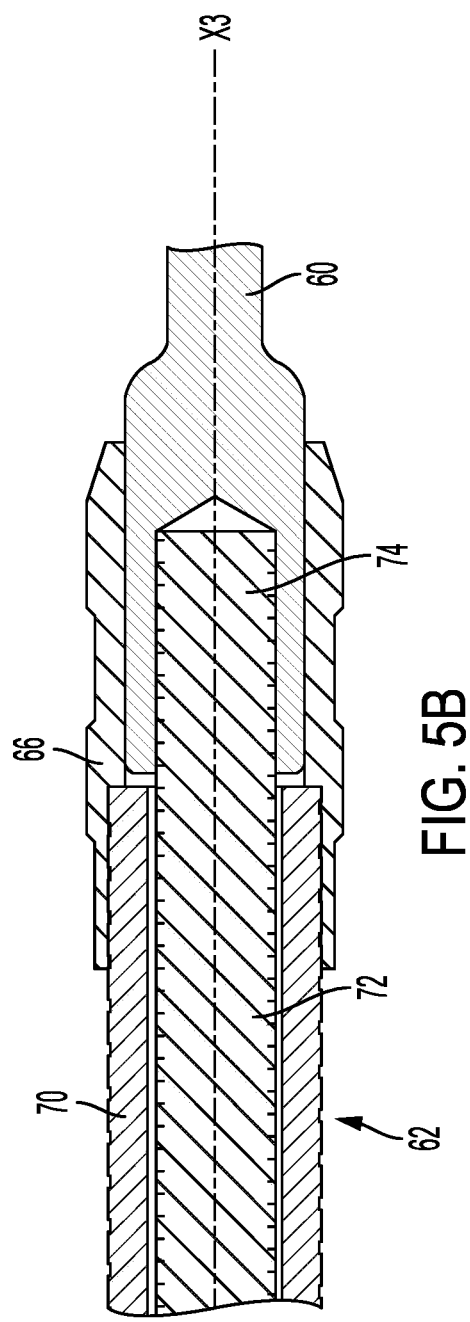
FIG. 5A
FIG. 5B

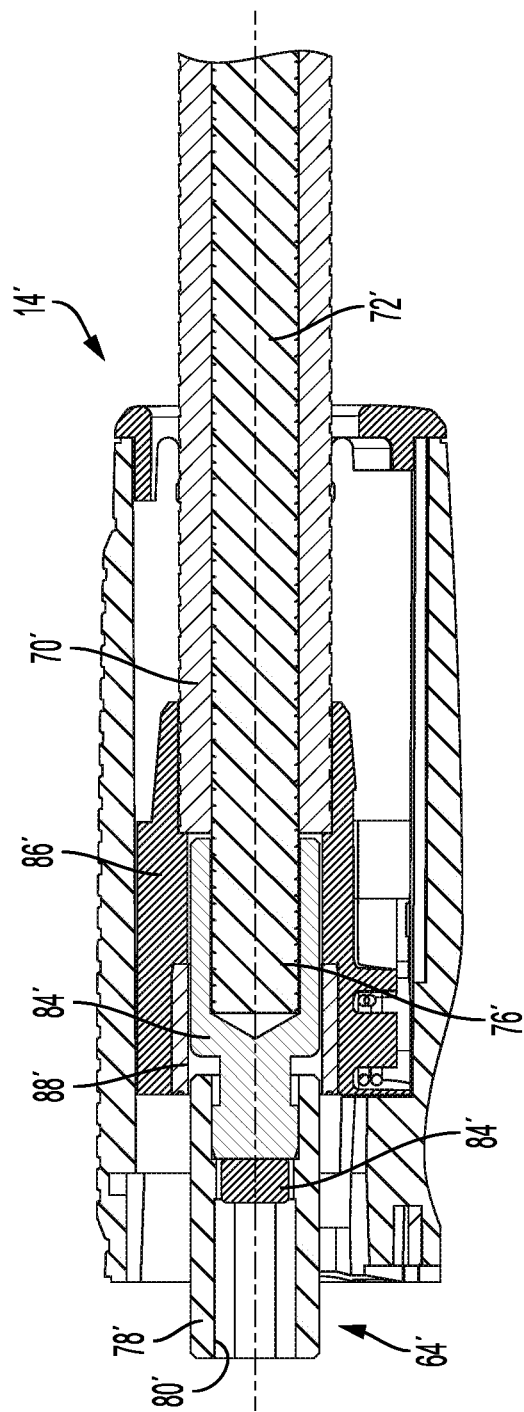
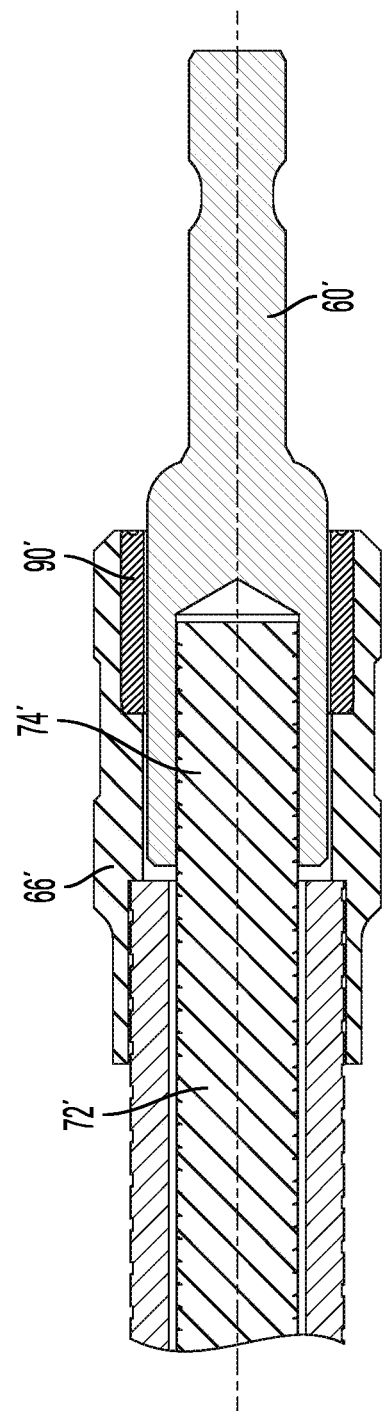
FIG. 5C
FIG. 5D

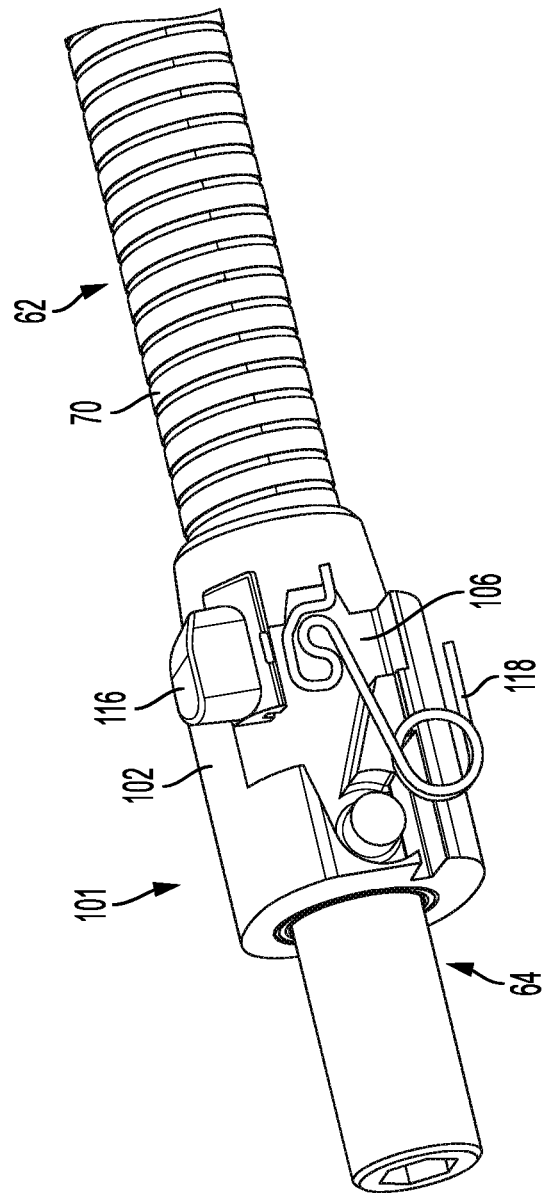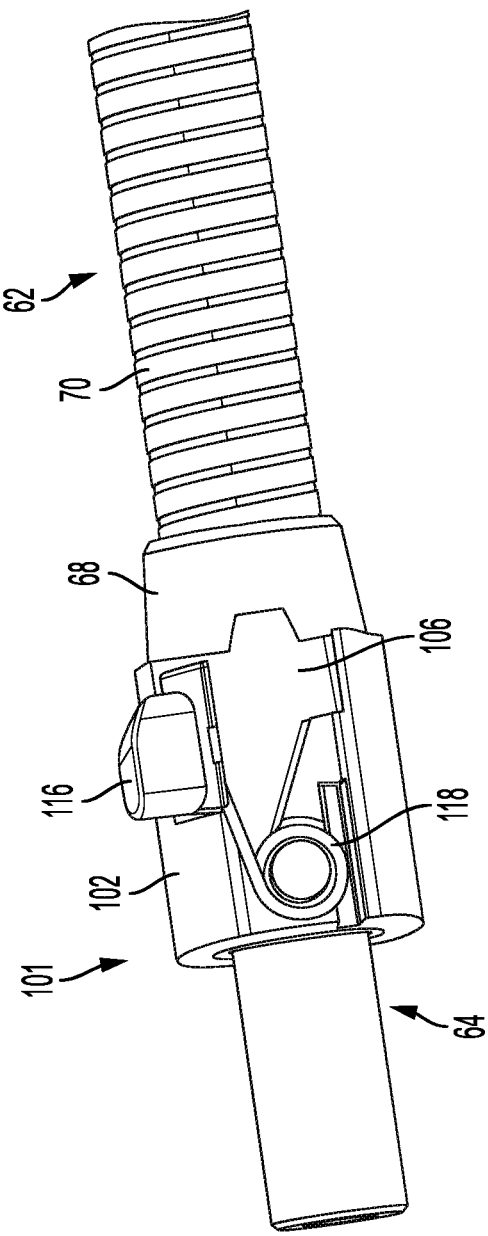

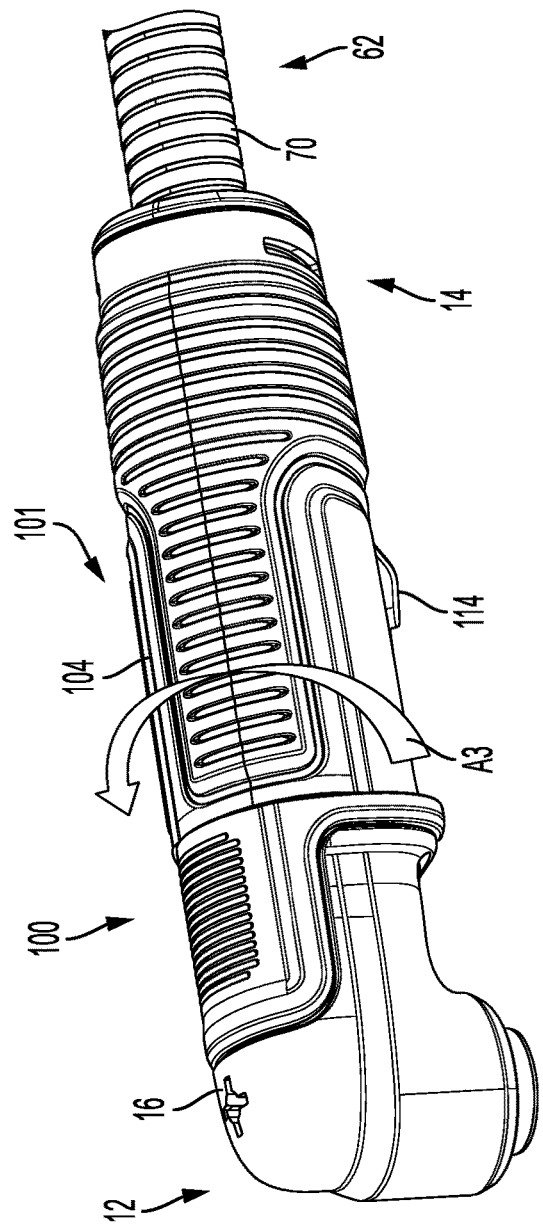
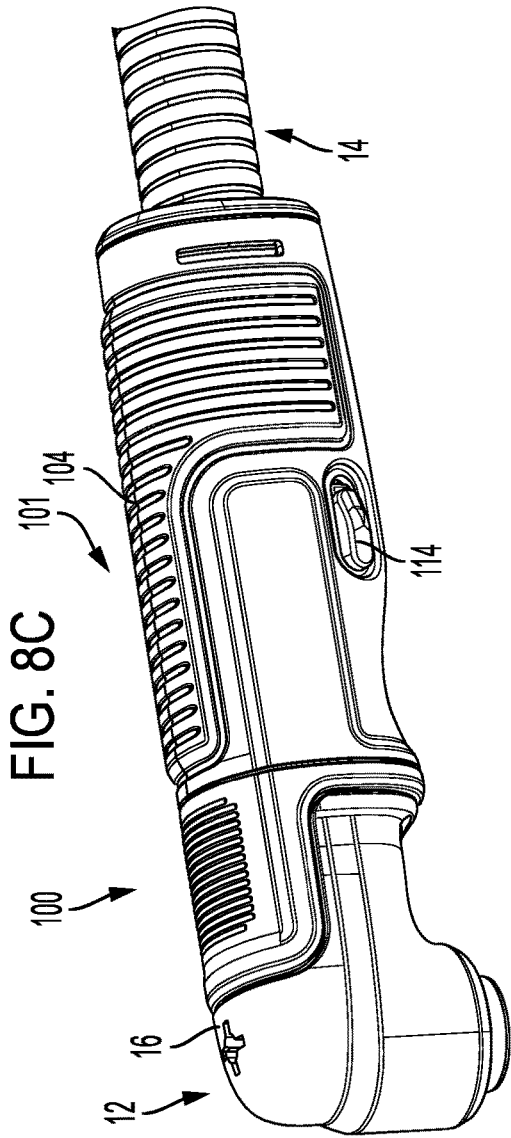
FIG. 8C
FIG. 8D

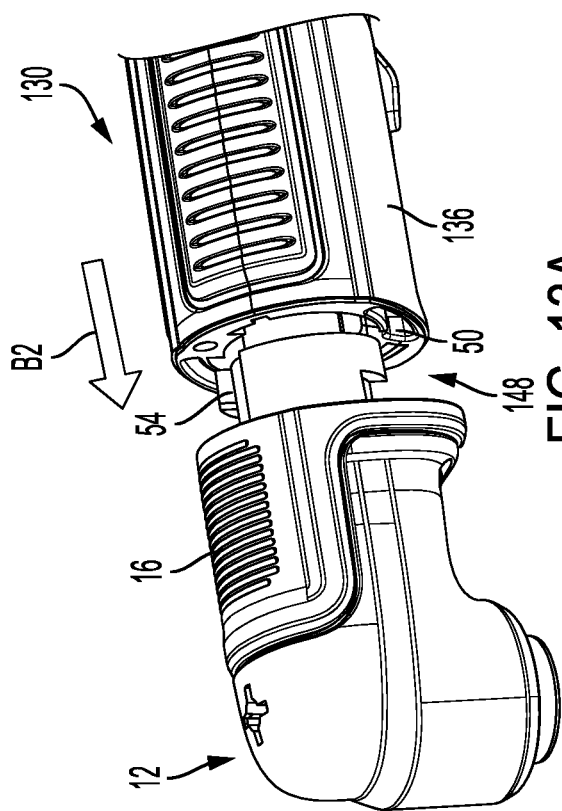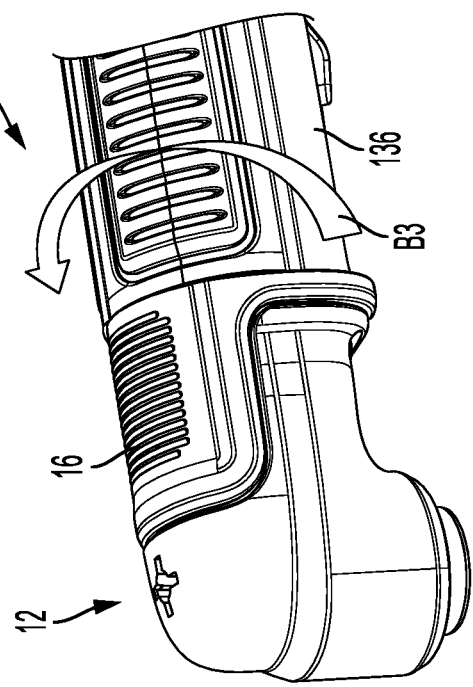

MODULAR TOOL BIT HOLDER SYSTEM

RELATED APPLICATION

This application claims priority, under 35 U.S.C. § 120, to U.S. patent application Ser. No. 16/858,896, filed Apr. 27, 2020, titled "Modular Tool Bit Holder System," which claims priority, under 35 U.S.C. § 119(e), to U.S. Provisional Application No. 62/845,363, filed May 9, 2019, titled "Modular Tool Bit Holder System," each of which is incorporated by reference.

TECHNICAL FIELD

This application relates to a modular tool bit holder system.

BACKGROUND

Tool bit holders, such as angled tool bit holders, flexible shaft tool bit holders, and quick release tool bit holders, may be used with power tools to enhance their functionality in driving tool bits, such as drill bits, screwdriver bits, and other fastening bits. These tool bit holders may enable users to access various workpiece regions. However, these existing bit holders may not be able to reach certain difficult to access workpiece regions. In addition, using these existing bit holders in combination can make their operation unstable and subject to high vibration stresses.

SUMMARY

In an aspect, a modular tool bit holder system includes an angle tool bit holder and a flexible shaft tool bit holder. The angle tool bit holder includes a housing that contains a first input shaft rotatably drivable about a first axis, a first angle gear rotatably drivable by the input shaft about the first axis, a second angle gear rotatably drivable by the first angle gear about a second axis at an angle to the first axis, and a first bit holder rotatably drivable by the second gear about the second axis. The flexible shaft tool bit holder includes a second input shaft rotatably drivable about a third axis, a flexible intermediate shaft assembly bendable into a plurality of curved, straight, and/or curvilinear configurations, and a second tool bit holder rotatably drivable about a fourth axis, the flexible intermediate shaft assembly configured to transmit rotation from the second input shaft to the second tool bit holder. A connection assembly is operable to selectively non-rotatably couple the angle tool bit holder and the flexible shaft tool bit holder relative to one another. The system is operable in (a) a first configuration in which the angle tool bit holder is operable without the flexible shaft tool bit holder to drive a first tool bit coupled to the first tool bit holder by coupling the first input shaft to a rotatable output member of a power tool, (b) a second configuration in which the flexible shaft tool bit holder is operable without the angle tool bit holder to drive a second tool bit coupled to the second tool bit holder by coupling the second input shaft to a rotatable output member of a power tool, and (c) a third configuration in which the angle tool bit holder and the flexible shaft tool bit holder are operable in combination to drive a third tool bit coupled to the first tool bit holder by coupling the second input shaft to a rotatable output member of a power tool, coupling the first input shaft to the second tool bit holder, and operating the sleeve to non-rotatably couple the flexible shaft tool bit holder and the housing of the angle tool bit holder.

Implementations of this aspect may include one or more of the following features. In the third configuration, the connection assembly may be configured to axially retain the flexible shaft tool bit holder relative to the housing of the angle tool bit holder. The connection assembly may include a sleeve assembly including a sleeve non-rotatably coupled to the flexible shaft tool bit holder and moveable along the fourth axis between a rearward position in which the sleeve is not engageable with the housing and a forward position in which the sleeve is engageable with the housing. The sleeve assembly may further include a lock member configured to retain the sleeve in at least one of the rearward position and the forward position. The flexible shaft tool bit holder may further include a collar non-rotatably coupled to a front end of the flexible shaft tool bit holder, and the lock member may include a lock button coupled to the collar and receivable in a slot in the sleeve when the sleeve is in the rearward position to retain the sleeve in the rearward position. The lock button may be actuatable by a user to enable the sleeve to be moved from the rearward position to the forward position. In the rearward position, the sleeve may expose the second bit holder and, in the forward position, the sleeve may at least partially cover the second bit holder.

The connection assembly may further include a first engagement structure on one of the housing and the sleeve and a second engagement structure on the other of the housing and the sleeve that non-rotatably engages the first engagement structure. The first engagement structure may include a first bayonet connector and the second engagement structure may include a second bayonet connector. The first bayonet connector may include an L-shaped slot and the second bayonet connector may include a projection receivable in the L-shaped slot. The first engagement structure may include a circumferential recess and the second engagement structure may include a tab configured to engage the circumferential recess to inhibit rotation of the housing and the sleeve relative to each other.

The first input shaft may include a polygonal shaft that extends out of the housing. The angle may be a right angle. The first bit holder may include a square drive configured to receive a socket or may include an output shaft with a first socket configured to receive at tool bit and a first bit retention device coupled to the output shaft. The first bit retention device may include at least one of a magnet, a retaining ball, a retaining ring, and a clip. The second input shaft may include a polygonal shaft. The flexible intermediate shaft assembly may include a non-rotating flexible sheath and a rotating flexible shaft received in the sheath and configured to transmit rotation from the second input shaft to the second output shaft. The flexible shaft and the flexible sheath may have a gooseneck structure.

The second tool bit holder may include an output shaft with a second recess configured to receive a tool bit and a second tool bit retention device coupled to the output shaft. The second tool bit retention device may include at least one of a magnet, a retaining ball, a retaining ring, and a clip. The second tool bit retention device may include a quick release collar received over the output shaft and axially moveable between a locked position in which the collar causes the second tool bit retention device to engage a tool bit for retention in the recess, and an unlocked position in which the collar allows the bit retention device to be disengaged from the tool bit for release from the recess.

The system may further include an extension handle including a third input shaft rotatably drivable about a fifth axis, a third output shaft rotatably drivable about the fifth axis by the third input shaft, and a handgrip receivable at least partially over the third output shaft. The system may be operable in a fourth configuration in which the angle tool bit holder and the extension handle are operable in combination to drive a fourth tool bit received by the first tool bit holder by coupling the third input shaft to a rotatable output member of a power tool and coupling the first input shaft to the third output shaft, with the handgrip configured to non-rotatably couple the extension handle to the housing. The third input shaft may include a third polygonal shaft extending rearward from the handgrip. The third output shaft may include a third recess configured to receive the first input shaft. The third recess may include a flared open front end and a polygonal closed rear end. The housing may include a first engagement structure and the handgrip may include a third engagement structure that non-rotatably engages the first engagement structure. One of the first engagement structure and the second engagement structure may include a first bayonet connector and the other of the first engagement structure and the second engagement structure may include a third bayonet connector. The first engagement structure may include an L-shaped slot and the third engagement structure may include a projection receivable in the L-shaped slot. The first engagement structure may include a tab and the second engagement structure may include a circumferential recess configured to be engaged by the tab. The tab may include a spring configured to bias the tab axially into engagement with the circumferential recess.

In another aspect, a modular tool bit holder system includes an angle tool bit holder, a flexible shaft tool bit holder, and an extension handle. The angle tool bit holder includes a housing that contains a first input shaft rotatably drivable about a first axis, a first angle gear rotatably drivable by the input shaft about the first axis, a second angle gear rotatably drivable by the first angle gear about a second axis at an angle to the first axis, and a first bit holder rotatably drivable by the second gear about the second axis. The flexible shaft tool bit holder includes a second input shaft rotatably drivable about a third axis, a flexible intermediate shaft assembly bendable into a plurality of curved, straight, and/or curvilinear configurations, and a second tool bit holder rotatably drivable about a fourth axis, the flexible intermediate shaft assembly configured to transmit rotation from the second input shaft to the second tool bit holder. The extension handle includes a third input shaft rotatably drivable about a fifth axis and a third output shaft rotatably drivable about the fifth axis by the third input shaft. The system is operable in (a) a first configuration in which the angle tool bit holder is usable without the flexible shaft tool bit holder and the extension handle to drive a first tool bit received by the first tool bit holder by coupling the first input shaft to a rotatable output member of a power tool, (b) a second configuration in which the flexible shaft tool bit holder is usable without the angle tool bit holder and the extension handle to drive a second tool bit received by the second tool bit holder by coupling the second input shaft to a rotatable output member of a power tool, (c) a third configuration in which the angle tool bit holder and the flexible shaft tool bit holder are operable in combination without the extension handle to drive a third tool bit received by the first tool bit holder by coupling the second input shaft to a rotatable output member of a power tool and coupling the first input shaft to the second tool bit holder, and (d) a fourth configuration in which the angle tool bit holder and the extension handle are usable together without the flexible shaft tool bit holder to drive a fourth tool bit received by the first tool bit holder by coupling the third input shaft to a rotatable output member of a power tool and coupling the first input shaft to the third output shaft.

Implementations of this aspect may include one or more of the following features. The system may be further operable in a fifth configuration in which the angle tool bit holder, the flexible shaft tool bit holder, and the extension handle are usable together to drive a fifth tool bit received by the first tool bit holder by coupling the first input shaft to the second tool bit holder, coupling the second input shaft to the third output shaft, and coupling the third input shaft to a rotatable output member of a power tool.

A connection assembly may be operable to selectively non-rotatably couple the angle tool bit holder and the flexible shaft tool bit holder relative to one another when the system is operable in the third configuration. In the third configuration, the connection assembly may be configured to axially retain the flexible shaft tool bit holder relative to the housing of the angle tool bit holder. The connection assembly may include a sleeve assembly including a sleeve non-rotatably coupled to the flexible shaft tool bit holder and moveable along the fourth axis between a rearward position in which the sleeve is not engageable with the housing and a forward position in which the sleeve is engageable with the housing. The sleeve assembly may further include a lock member configured to retain the sleeve in at least one of the rearward position and the forward position. The flexible shaft tool bit holder may further include a collar non-rotatably coupled to a front end of the flexible shaft tool bit holder, and the lock member comprises a lock button coupled to the collar and receivable in a slot in the sleeve when the sleeve is in the rearward position to retain the sleeve in the rearward position. The lock button may be actuatable by a user to enable the sleeve to be moved from the rearward position to the forward position. In the rearward position, the sleeve may expose the second bit holder and, in the forward position, the sleeve may at least partially cover the second bit holder.

The connection assembly may further include a first engagement structure on one of the housing and the sleeve and a second engagement structure on the other of the housing and the sleeve that non-rotatably engages the first engagement structure. The first engagement structure may include a first bayonet connector and the second engagement structure may include a second bayonet connector. The first bayonet connector may include an L-shaped slot and the second bayonet connector may include a projection receivable in the L-shaped slot. The first engagement structure may include a circumferential recess and the second engagement structure may include a tab configured to engage the circumferential recess to inhibit rotation of the housing and the sleeve relative to each other.

The first input shaft may include a polygonal shaft that extends out of the housing. The angle may be a right angle. The first bit holder may include a square drive configured to receive a socket or may include an output shaft with a first socket configured to receive at tool bit and a first bit retention device coupled to the output shaft. The first bit retention device may include at least one of a magnet, a retaining ball, a retaining ring, and a clip. The second input shaft may include a polygonal shaft. The flexible intermediate shaft assembly may include a non-rotating flexible sheath and a rotating flexible shaft received in the sheath and configured to transmit rotation from the second input shaft to the second output shaft. The flexible shaft and the flexible sheath may have a gooseneck structure.

The second tool bit holder may include an output shaft with a second recess configured to receive a tool bit and a second tool bit retention device coupled to the output shaft. The second tool bit retention device may include at least one of a magnet, a retaining ball, a retaining ring, and a clip. The second tool bit retention device may include a quick release collar received over the output shaft and axially moveable between a locked position in which the collar causes the second tool bit retention device to engage a tool bit for retention in the recess, and an unlocked position in which the collar allows the bit retention device to be disengaged from the tool bit for release from the recess.

The third input shaft may include a third polygonal shaft extending rearward. The third output shaft may include a third recess configured to receive the first input shaft. The third recess may include a flared open front end and a polygonal closed rear end. The extension handle may further include a handgrip receivable at least partially over the third output shaft and not rotatably drivable by the third input shaft. In the fourth configuration, the handgrip may be configured to non-rotatably couple the extension handle to the housing. The housing may include a first engagement structure and the handgrip may include a third engagement structure that non-rotatably engages the first engagement structure. One of the first engagement structure and the second engagement structure may include a first bayonet connector and the other of the first engagement structure and the second engagement structure may include a third bayonet connector. The first engagement structure may include an L-shaped slot and the third engagement structure may include a projection receivable in the L-shaped slot. The first engagement structure may include a tab and the second engagement structure may include a circumferential recess configured to be engaged by the tab. The tab may include a spring configured to bias the tab axially into engagement with the circumferential recess.

Advantages may include one or more of the following. The tool bit holder system may enable use of a combination of tool bit holders, allowing better access to difficult to reach workpiece regions. This system also reduces instability and vibration when the tool bit holders are used in combination. Finally, this system provides a range of versatile tool bit holders in a single system and usable in various combinations to provide greater functionality. These and other advantages and features will be apparent from the description, the drawings, and the claims.

BRIEF DESCRIPTION OF THE DRAWINGS

FIG. 1A is a perspective view of an embodiment of a tool bit holder system including an angle tool bit holder and a flexible shaft tool bit holder.

FIG. 1B is a side view of the system of FIG. 1A.

FIG. 5A is a cross-sectional view of the flexible shaft tool bit holder of FIG. 4, taken along line 5A-5A.

FIG. 5B is a cross-sectional view of the flexible shaft tool bit holder of FIG. 4, taken along line 5B-5B.

FIG. 5C is a close-up cross-sectional view of a front end portion of an alternative embodiment of a flexible shaft tool bit holder.

FIG. 5D is a close-up cross-sectional view of a rear end portion of the alternative embodiment of the flexible shaft tool bit holder of FIG. 5C.

FIGS. 7A-7B are perspective views of the sleeve assembly of FIG. 6 with the sleeve removed.

FIGS. 8A-8D, 9A, and 9B are perspective views of the angle tool bit holder and the flexible shaft tool bit holder, illustrating operation of the system in a third configuration.

FIGS. 13A-13C and 14A-14B are perspective views of the angle tool bit holder and the handle extension, showing operation of the system in a fourth configuration.

DETAILED DESCRIPTION

Figure 1C:
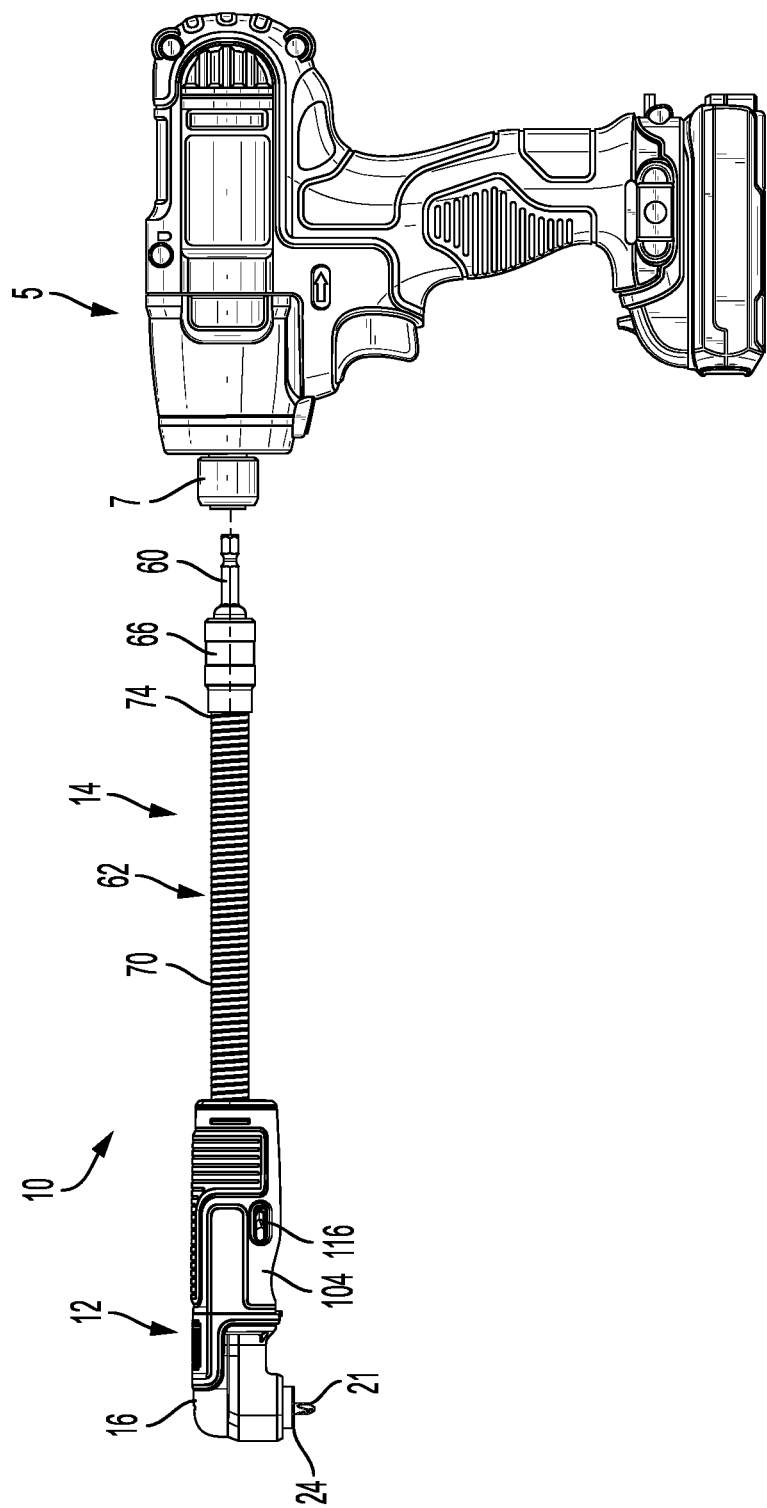
FIG. 1C is a side view of the system of FIG. 1A coupleable to a tool holder of a rotary power tool.

Referring to FIGS. 1A and 1B, in an embodiment, a modular tool bit holder system 10 includes an angle tool bit holder 12 and a flexible shaft tool bit holder 14. Referring also to FIGS. 2A-3B, the angle tool bit holder 12 includes a housing 16 that contains a first input shaft 18 rotatably drivable about a first axis X1, a first angle gear 20 rotatably drivable by the input shaft 18 about the first axis X1, a second angle gear 22 rotatably drivable by the first angle gear about a second axis X2 at an angle α (e.g., an approximately right angle) to the first axis X1, and a first tool bit holder 24 rotatably drivable by the second gear 22 about the second axis X2. The angle tool bit holder 12 or some of its components may have a structure and/or function substantially similar to one or more embodiments of a right angle attachment disclosed in U.S. Pat. No. 9,314,852, which is incorporated herein by reference in its entirety.

In an embodiment, the housing 16 is generally L-shaped with an input portion 17 and an output portion 19. The input portion 17 of the housing 16 includes a grip portion 46 and a rear cylindrical protrusion 48. The first input shaft 18 comprises a polygonal (e.g., hexagonal) shaft 26 that extends out of the input portion 17 of the housing 16 and that has an annular ball groove 28 so that the input shaft 18 is configured to be received in a rotatable output member 7 (e.g., a chuck or quick release bit holder) of a rotary power tool 5 (e.g., a drill, an impact driver, or a screwdriver), as shown in FIG. 1C. The input shaft 18 is supported in the housing 16 by a first bearing 30 (e.g., a sleeve bearing) and is fixedly coupled to the first angle gear 20 (e.g., by a press fit connection). The first angle gear 20 may be a right angle bevel gear and is supported in the input portion 17 of the housing 16 by a second bearing 32. The second angle gear 22 may be a right angle bevel gear and is supported in the output portion 19 of the housing 16 by a third bearing 34. The first tool bit holder 24 is fixedly coupled to (e.g., integrally formed with) the second angle gear 22 and may protrude from the output portion 19 of the housing 16.

Figure 3B:
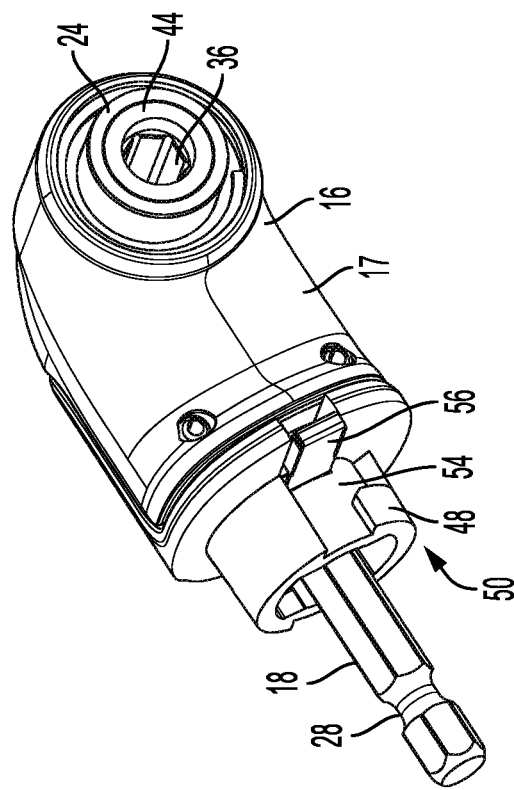
FIGS. 3A and 3B are perspective views of the angle tool bit holder of FIG. 2A.
Figure 3A:
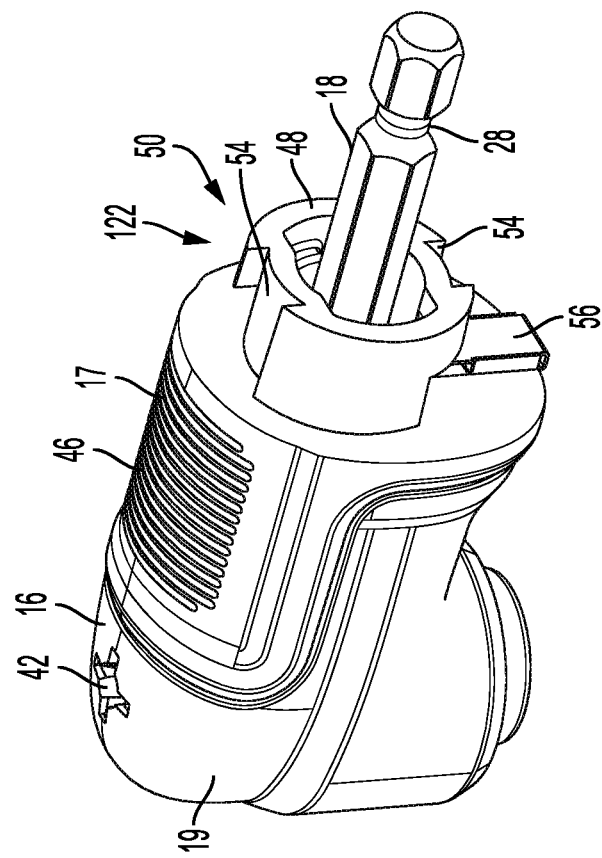
Figure 3C:
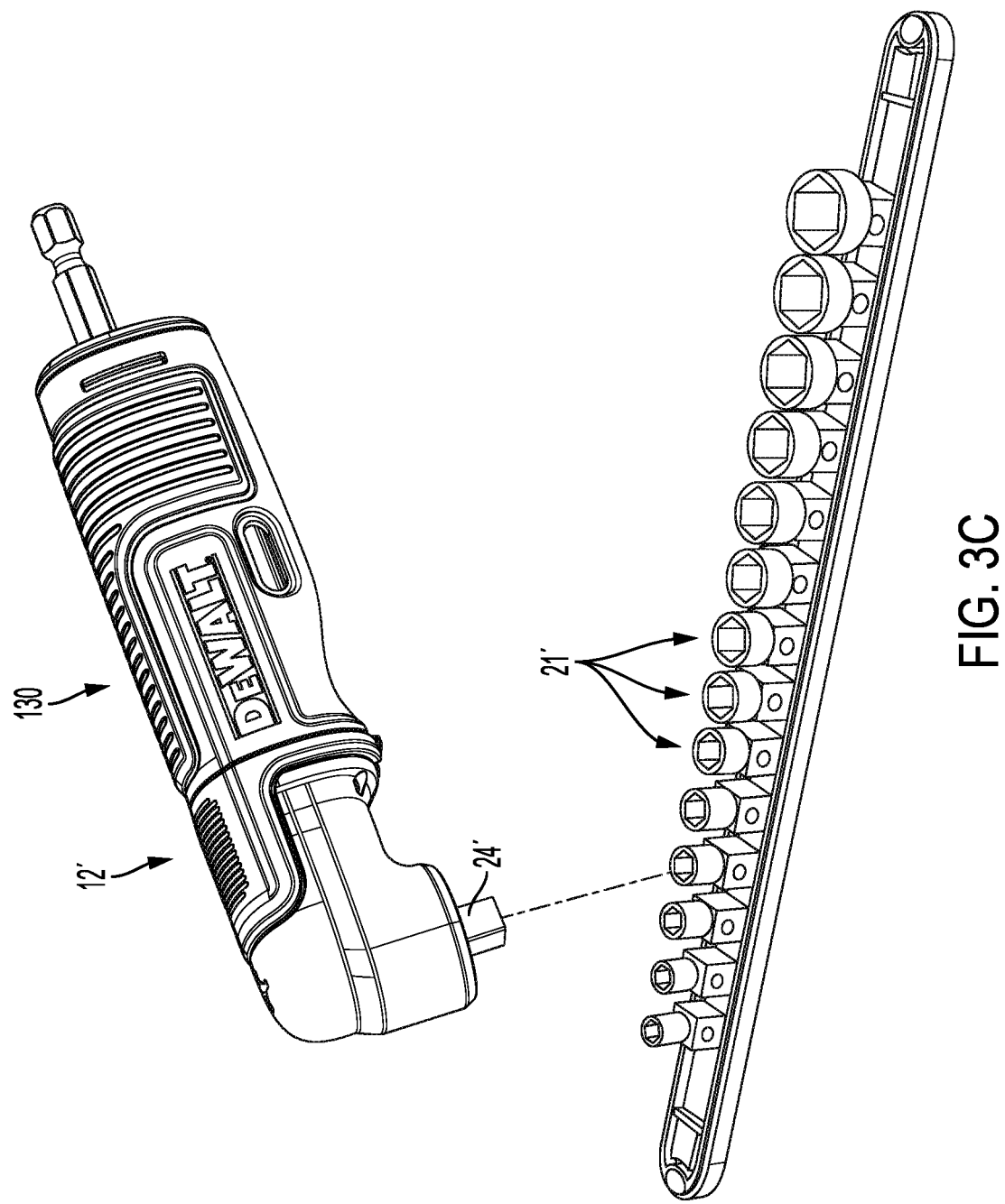
FIG. 3C is a perspective view of another embodiment of the angle tool bit holder with a bit holder configured to engage sockets.

The first tool bit holder 24 includes a cavity 36 (e.g., a polygonal or hexagonal cavity) extending through the angle gear 22 along the second axis X2 and open at its front end 38. A first bit retention device, e.g., a first magnet 40 is received in the cavity 36 to removably retain a tool bit 21 (e.g., a screwdriving bit) that is received in the cavity 36. An aperture 42 is formed through the top of the housing 16 and the first magnet 40 to facilitate insertion of a small hand tool such as a screwdriver into cavity 36 to remove a tool bit that is being retained in the cavity 36. Optionally, a second, ring-shaped magnet 44 is received in the front end 38 of the cavity 36 to engage the head of a fastener (e.g., a screw) that is being rotatably driven by the tool bit 21 received in the cavity 36. In other embodiments, the first bit retention device may additionally or alternatively include one or more of a retaining ball, a retaining ring, a retaining clip, and a quick release collar received over the output shaft and axially moveable between a locked position in which the collar causes the bit retention device to engage a tool bit for retention in the recess, and an unlocked position in which the collar allows the bit retention device to be disengaged from the tool bit for release from the recess. Alternative embodiments for the first tool bit holder may be found, for example, in U.S. Pat. Nos. 10,150,205; 7,086,813; 6,929,266; 6,261,035; and 5,988,957, which are incorporated herein by reference in their entirety. As shown in FIG. 3C, in another alternate embodiment, an angle tool bit holder 12', similar to angle tool bit holder 12, may have a bit holder 24' in the form of a square drive configured to engage and drive a plurality of hex sockets 21' for driving nuts and hex heads of fasteners.

Figure 2A:
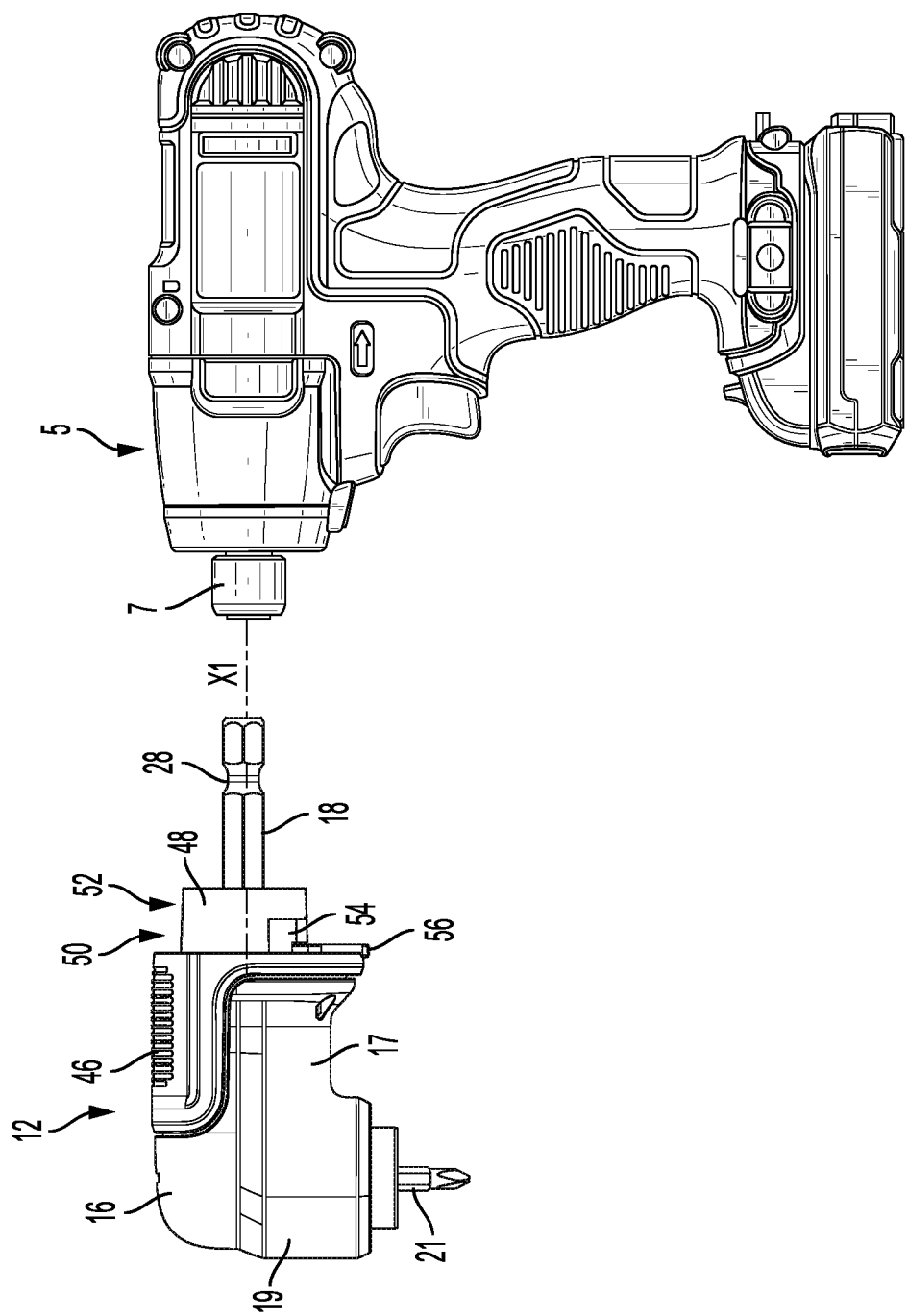
FIG. 2A is a side view of the angle tool bit holder of FIG. 1A showing operation of the system in a first configuration.
Figure 2B:
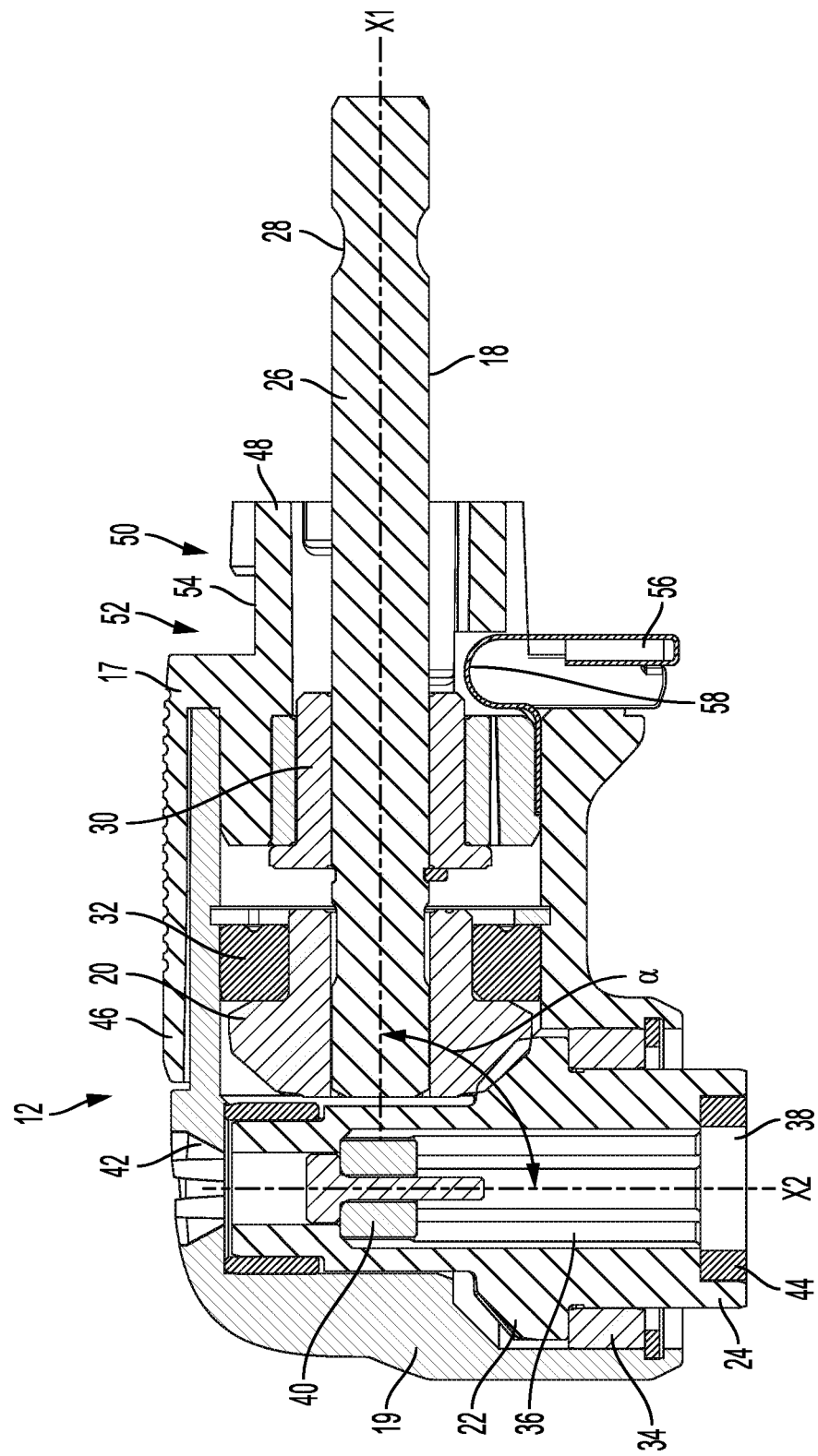
FIG. 2B is a cross-sectional view of the angle tool bit holder of FIG. 2A.

Referring to FIG. 2A, in a first configuration, the angle tool bit holder 12 is usable by itself (e.g., without the flexible shaft tool bit holder 14) to drive the first tool bit 21 received by the first tool bit holder 24. The first input shaft 18 is configured to be received in a rotatable output member 7 (e.g., a chuck or quick release bit holder) of a rotary power tool 5 (e.g., a drill, an impact driver, or a screwdriver). Rotational torque from the power tool may be transmitted to the first tool bit 21 via the first input shaft 18, the first angle gear 20, the second angle gear 22, and the first tool bit holder 24.

Figure 4:
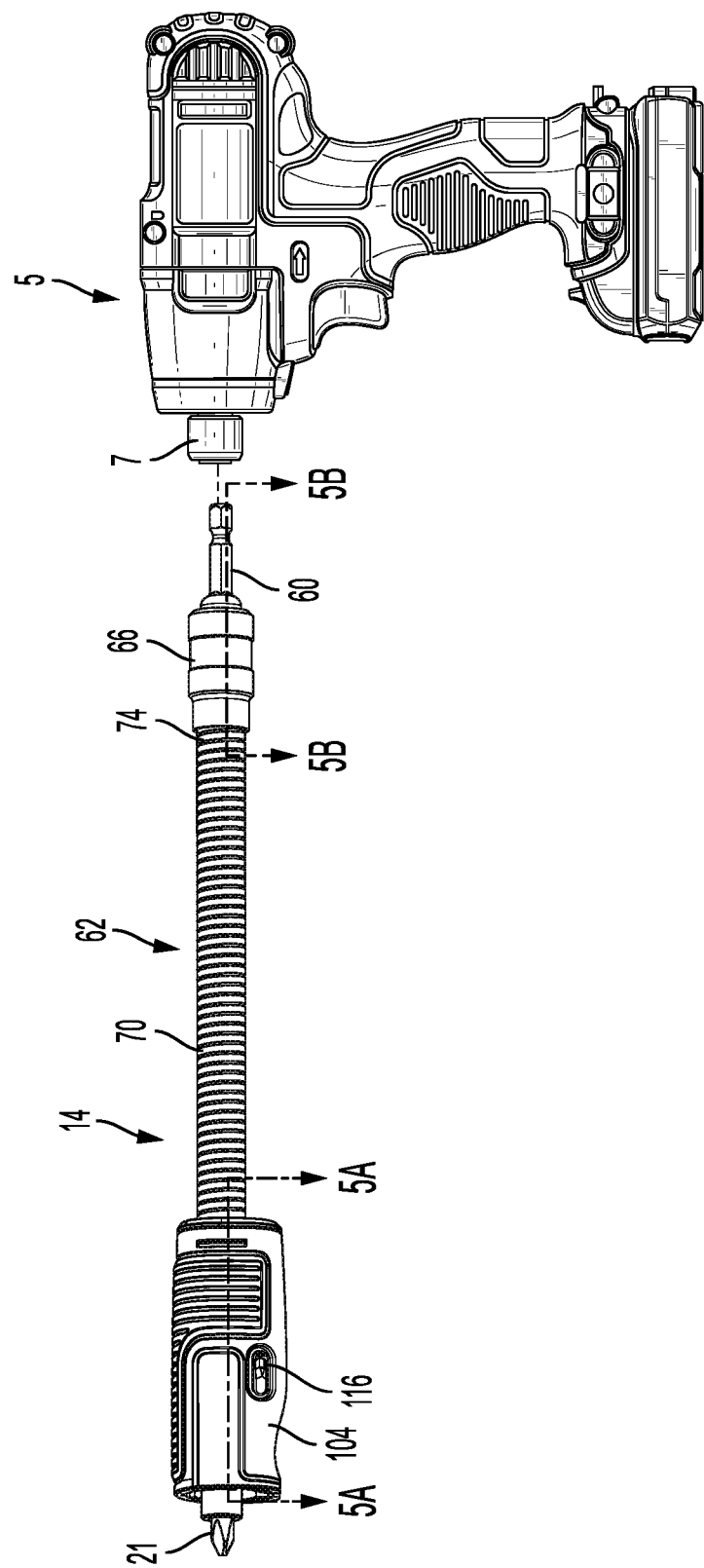
FIG. 4 is a perspective view of the flexible shaft tool bit holder of FIG. 1A showing operation of the system in a second configuration.

Referring also to FIGS. 4-5B, the flexible shaft tool bit holder 14 includes a second input shaft 60 rotatably drivable about a third axis X3, a flexible intermediate shaft assembly 62, and a second tool bit holder 64 rotatably drivable by the second input shaft 60, via the flexible intermediate shaft assembly 62, about a fourth axis X4. The second input shaft 60 has a polygonal (e.g., hexagonal) shape and an annular ball groove 61 so that the input shaft 60 is configured to be received in a bit holder (e.g., a quick release bit holder) of a rotary power tool such as a drill, an impact driver, or a screwdriver. The flexible intermediate shaft assembly 62 includes a generally cylindrical, rigid rear bushing 66, a generally cylindrical rigid front bushing 68, a flexible sheath 70 fixedly connected to and between the rear bushing 66 and the front bushing 68, and an inner flexible shaft 72 received through the flexible sheath 70, supported at its rear end 74 by the rear bushing 66 and at its front end 76 by the front bushing 68. The flexible intermediate shaft 72, but not the flexible sheath 70, is rotatably drivable by the second input shaft 60 and transmits rotation to the second tool bit holder 64. The inner flexible shaft 72 and the flexible sheath 70 each are bendable into a plurality of curved and straight configurations, and may be semi-rigidly retained in such configurations, e.g., they may have a gooseneck structure.

In an embodiment, the second bit holder 64 is a quick-release bit holder and comprises a generally cylindrical body 78 rotatably driven by the front end 76 of the flexible shaft 72. The body 78 includes a front recess or socket 80 (e.g., a hex or polygonal-shaped socket) with an open front end 82 for receiving a tool bit 23 therein. Optionally, the socket 80 includes a rear plunger bore 84 with an ejection spring 86 to facilitate ejecting a tool bit when it is released from the tool bit holder 64. The body 78 also includes an angular transverse slot 88 extending from the radially outer surface of the body 78 in an axially forward and radially inward direction to communicate with the interior of the 88. A retraction collar 90 is slidably mounted on the body 78 and retained in place by a bushing 92.

A coil spring 94 surrounds a portion of the body 78 and is disposed between the body 78 and the retraction collar 90. The coil spring 94 abuttingly engages a clip 96 that is received in the angular slot 88 and that is configured to releasably engage and retain the tool bit 23 in the socket 80. The retraction collar 90 includes a forward shoulder portion 98 that, when pulled rearward, can engage the spring 94 and pull the clip portion 98 rearward out of engagement with the tool bit 23 to enable its release from the socket 80. The retractable collar 90 may optionally include a ring magnet 99 at its front end to engage a head of a fastener being driven by a tool bit received in the socket 80. In other embodiments, the second bit holder may additionally or alternatively include one or more of a retaining ball, a retaining ring, and a magnet to engage a tool bit for retention in a socket or recess. Alternative embodiments for the second tool bit holder may be found, for example, in U.S. Pat. Nos. 10,150,205; 7,086,813; 6,929,266; 6,261,035; and 5,988,957, which are incorporated herein by reference in their entirety.

Referring to FIGS. 5C-5D, an alternative embodiment of a flexible shaft tool bit holder 14' is similar to the flexible shaft tool bit holder 14 except for the following differences. The flexible shaft tool bit holder 14' includes a second bit holder 64' having a generally cylindrical body 78' rotatably driven by the front end 76' of the flexible shaft 72'. The body 78' includes a front recess or socket 80' (e.g., a hex or polygonal-shaped socket) with an open front end 82' for receiving a tool bit 23' therein. Disposed in rear end 82' of the socket 80' is a magnet 84' configured to removably retain the tool bit therein and to magnetize the tool bit to help retain a fastener on the tool bit.

The front end 76' of the flexible shaft 72' is non-rotatably coupled to the second bit holder 64' by a fitting 84' that is press fit onto the front end 76' of the flexible shaft 72' and is pressed into an interior of the body 78'. A sheath extension or front bushing 86' is non-rotatably coupled to a front end of the sheath 70' and is received over the fitting 84'. A first sleeve bearing 88' is receive between the sheath extension 86' and the fitting 84' to reduce friction between these components when the flexible shaft 72' rotates. Similarly, a second sleeve bearing 90' is received between the rear bushing 66' and the input shaft 60' to reduce friction between the rear bushing 66' and the input shaft 60' when the input shaft 60' rotates.

Referring to FIG. 4, in a second configuration, the flexible shaft tool bit holder 14 is usable by itself (e.g., without the angle tool bit holder 12) to drive the second tool bit 23 received by the second tool bit holder 64. The second input shaft 60 is configured to be received in a rotatable output member 7 (e.g., a chuck or quick release bit holder) of a rotary power tool 5 (e.g., a drill, an impact driver, or a screwdriver). The flexible shaft assembly 62 can be bent into a variety of curved, straight, or curvilinear configurations and retained in such configurations. Output torque from the power tool is transmitted to the second tool bit 23 via the second input shaft 60, the flexible inner shaft 72 and the second tool bit holder 64.

Referring also to FIGS. 6A-7D, the bit holder system 10 may additionally include a connection assembly 100 configured to axially and non-rotatably couple the flexible shaft tool bit holder 14 to the housing 16 of the angle tool bit holder 12 in a third configuration of the system 10. In an embodiment, the connection assembly 100 comprises a sleeve assembly 101 (which may be coupled to one of the flexible shaft tool bit holder 14 and the angle tool bit holder 12) and a first engagement structure 50 (which may be coupled to the other the flexible shaft tool bit holder 14 and the angle tool bit holder 12). In the illustrated embodiment, the sleeve assembly 101 is coupled to flexible shaft tool bit holder 14 and the first engagement structure 50 is coupled to the angle tool bit holder 12, but it should be understood that these could be reversed, or that the sleeve assembly 101 may be coupled to neither of the bit holders 12, 14. The sleeve assembly 101 is removably engageable with the first engagement structure 50 to axially and non-rotatably fix the sleeve assembly 101 to the first engagement structure.

Figure 6A:
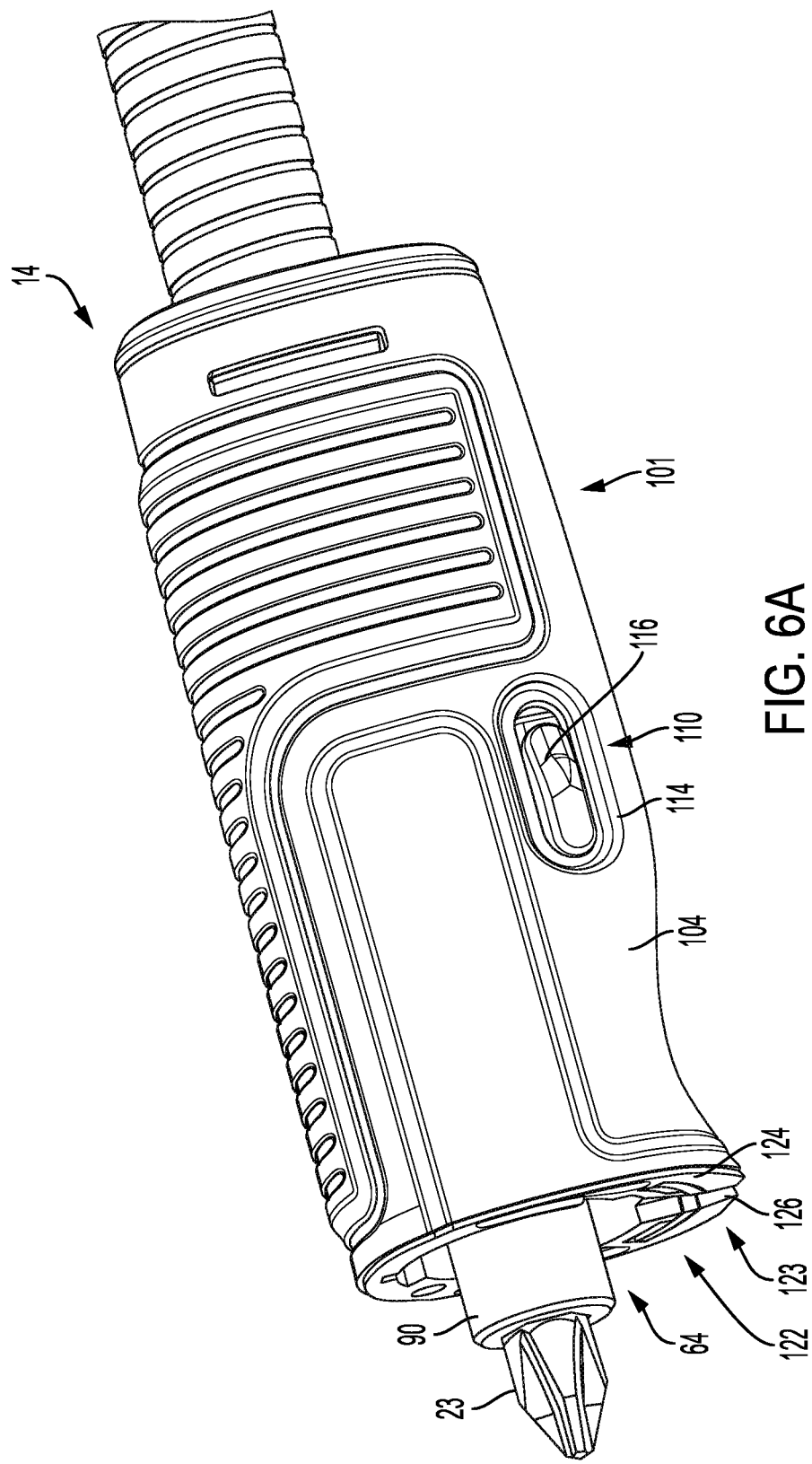
FIG. 6A is a perspective view of a sleeve assembly of the system of FIG. 4.
Figure 6C:
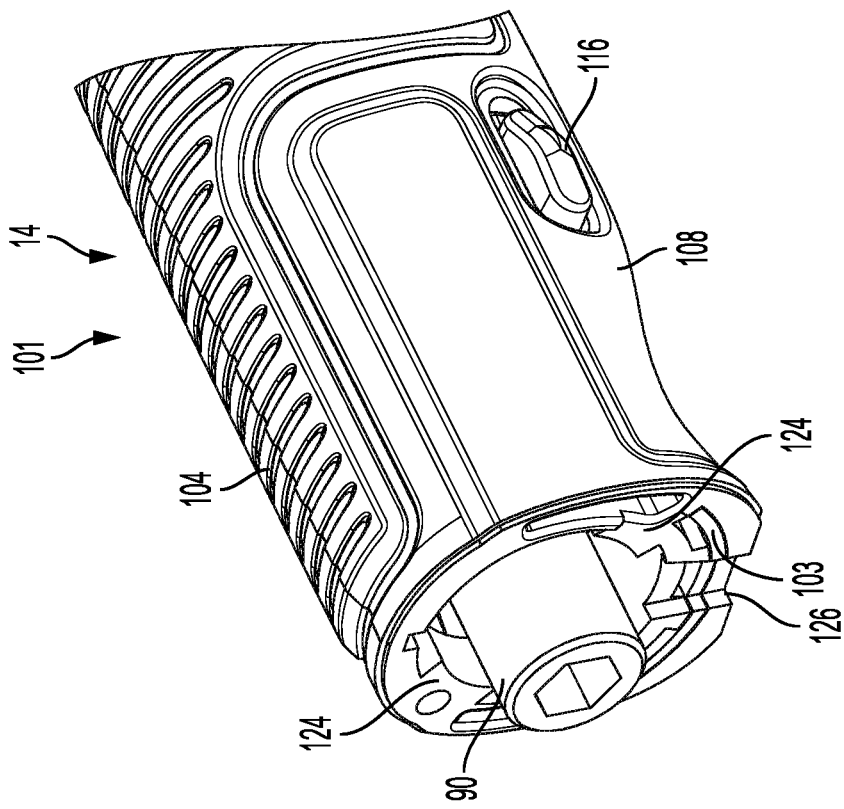
FIGS. 6B-6C are close-up perspective views of the front end of the sleeve assembly of FIG. 6A.
Figure 6B:
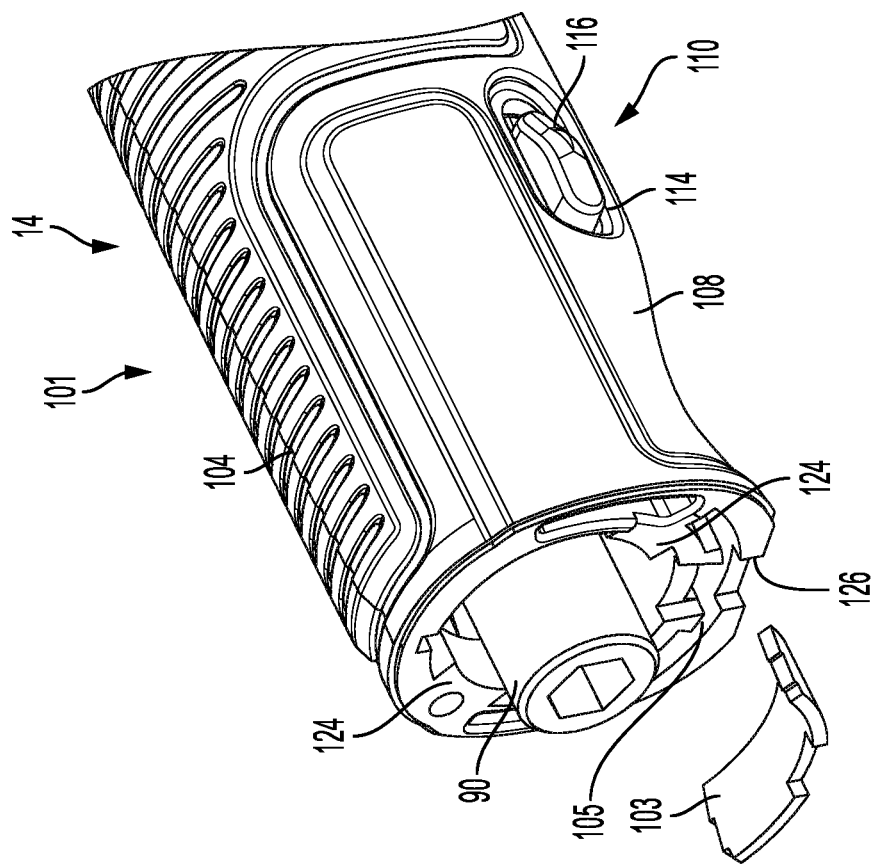
Figure 7C:
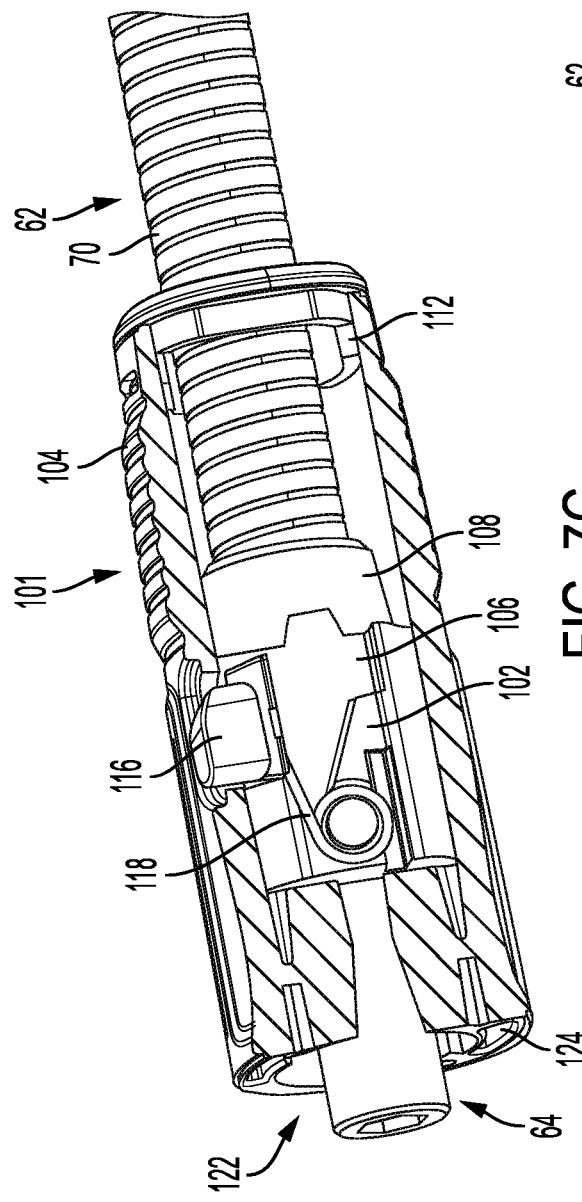
FIGS. 7C-7D are perspective views of the sleeve assembly of FIG. 6 partially in phantom.
Figure 7D:
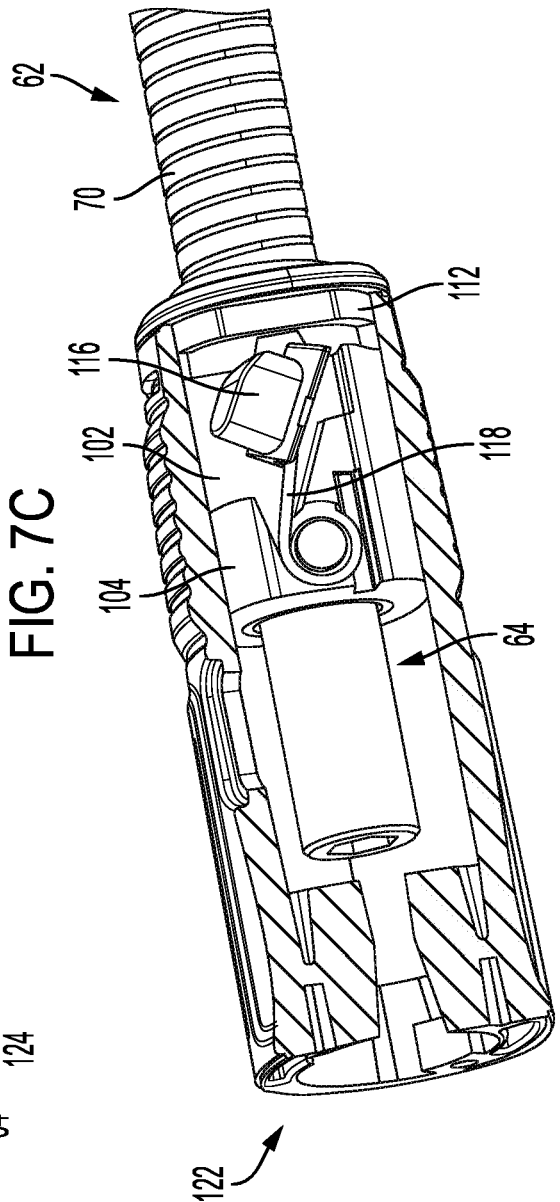

In an embodiment, the sleeve assembly 101 includes a generally cylindrical collar 102 fixedly coupled to (e.g., received over) the front bushing 68 and a generally cylindrical sleeve 104 non-rotatably received over the collar 102 for axial movement relative to the collar 102. For example, in the illustrated embodiment the collar 102 and the sleeve 104 each have a flat wall 106, 108 that engage each other to inhibit rotation therebetween. The sleeve 104 is axially moveable relative to the collar 102 along the fourth axis X4 between a rearward position (FIG. 7C) in which the sleeve 104 exposes all or most of the second bit holder 64 and is not engageable with the housing 16 of the angle tool bit holder 12, and a forward position in which the sleeve 104 covers some or all of the second bit holder 64 and is engageable with the housing 16 of the angle tool bit holder 12. Referring to FIGS. 6B and 6C, in an embodiment, a semi-cylindrical plate 103 (e.g., composed of metal) may be received in a pocket 105 in the front end of the sleeve 104 in order to increase strength of the sleeve 104 (e.g., composed of plastic) and improve its cycle life.

At least one of the sleeve 104 and the flexible shaft tool bit holder 14 includes a lock member 110 configured to retain the sleeve 104 in at least one of the rearward position and the forward position. For example, in an embodiment, the sleeve 104 includes a rear cap 112 that abuts the collar 102 to inhibit axially forward movement of the sleeve 104 when in its forward position and a slot 114 that receives a lock button 116 coupled to the collar 102 to inhibit axial movement of the sleeve 104 when in its rearward position.

The lock button 116 is moveably coupled to the collar 102 by a biasing member (e.g., a torsional spring or a leaf spring) 118 that biases the lock button 116 toward the slot 114. In the rearward position of the sleeve 104, the lock button 116 passes at least partially through the slot 114 to retain the sleeve 104 in the rearward position. To move the sleeve 104 to the forward position, a user depresses the lock button 116 into the slot 114 and pulls the sleeve 104 forward until the rear cap 112 abuts the collar 102.

The sleeve assembly 101 further includes a second engagement structure 122 on the sleeve 104 to non-rotatably and axially engage the first engagement structure 50. For example, the first engagement structure 50 may include a first bayonet-style connector 52 coupled to the cylindrical extension 48 on the housing 16. In an example, the first engagement structure 50 comprises two diametrically opposed L-shaped slots 54 and may further include a radially extending tab 56 biased rearwardly, e.g., by a leaf spring 58 or another biasing member. The second engagement structure 122 may include a second bayonet-type connection 123 coupled to a front end of the sleeve 104. In an example, the second engagement structure 122 comprises at least one (e.g., two diametrically opposed) radial inward projections 124 configured to engage the L-shaped slots 54 on the housing 16 and may further include a circumferential recess 126 configured to be engaged by the radially extending tab 56 on the housing 16.

Figure 8A:
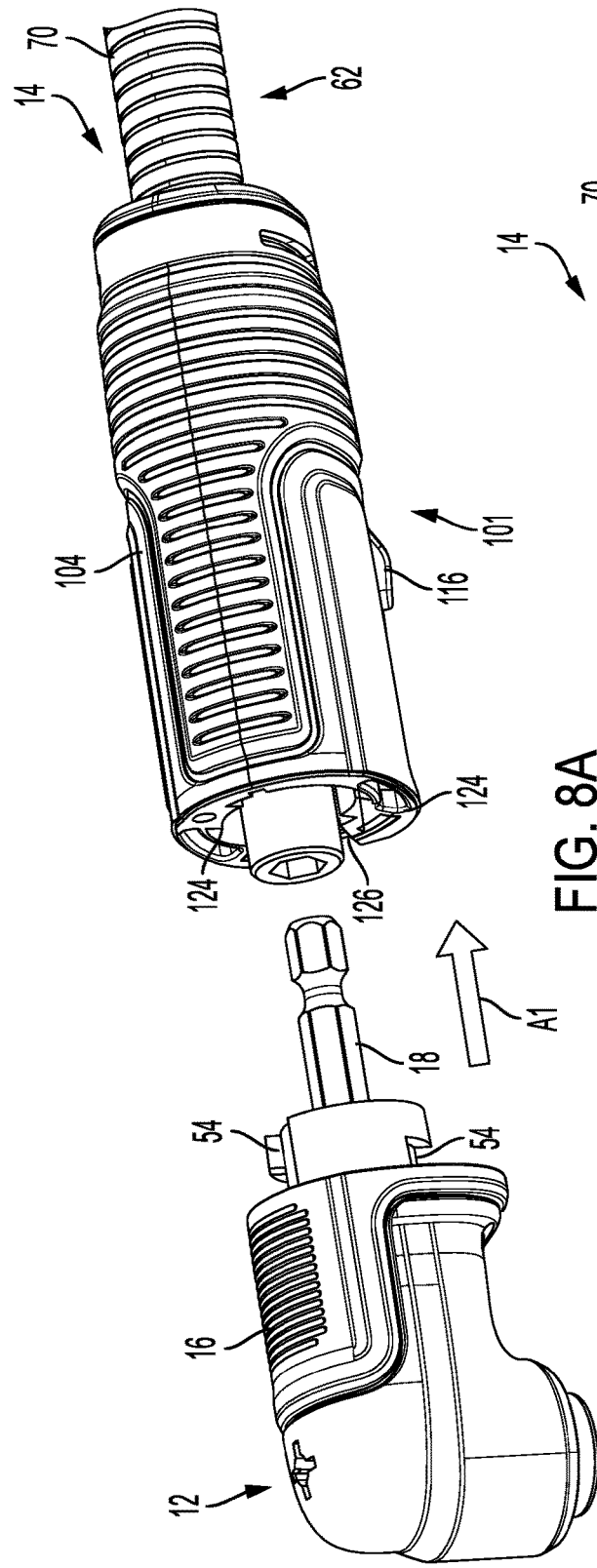
Figure 8B:
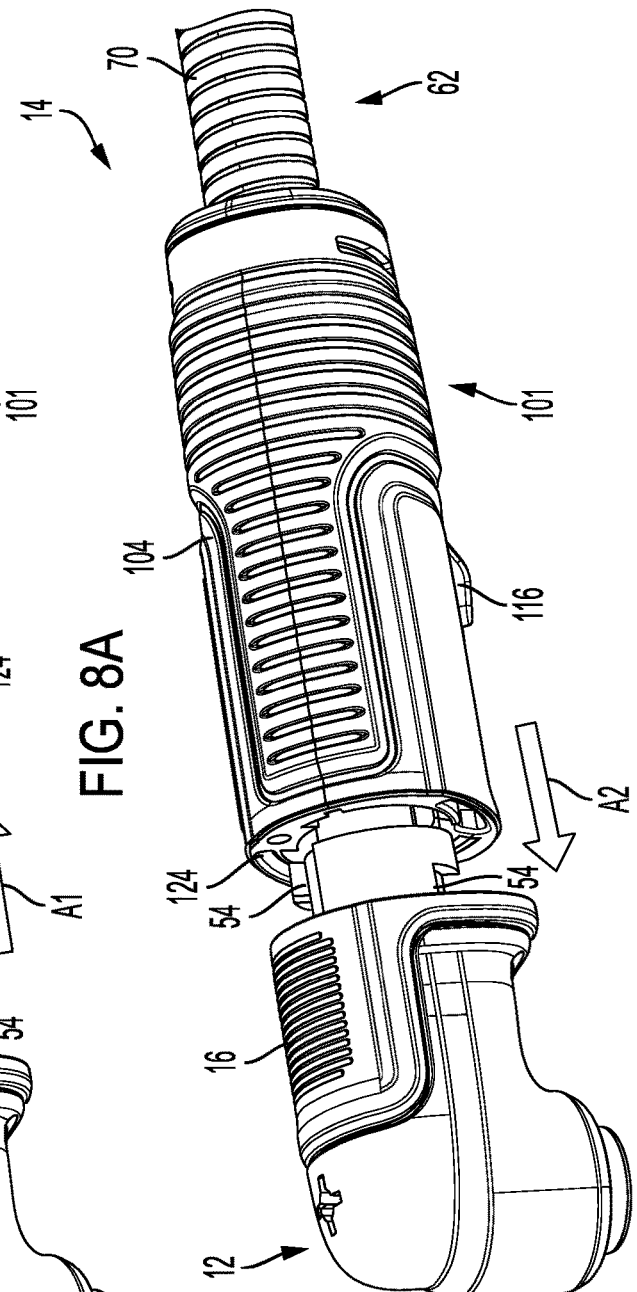
Figure 9A:
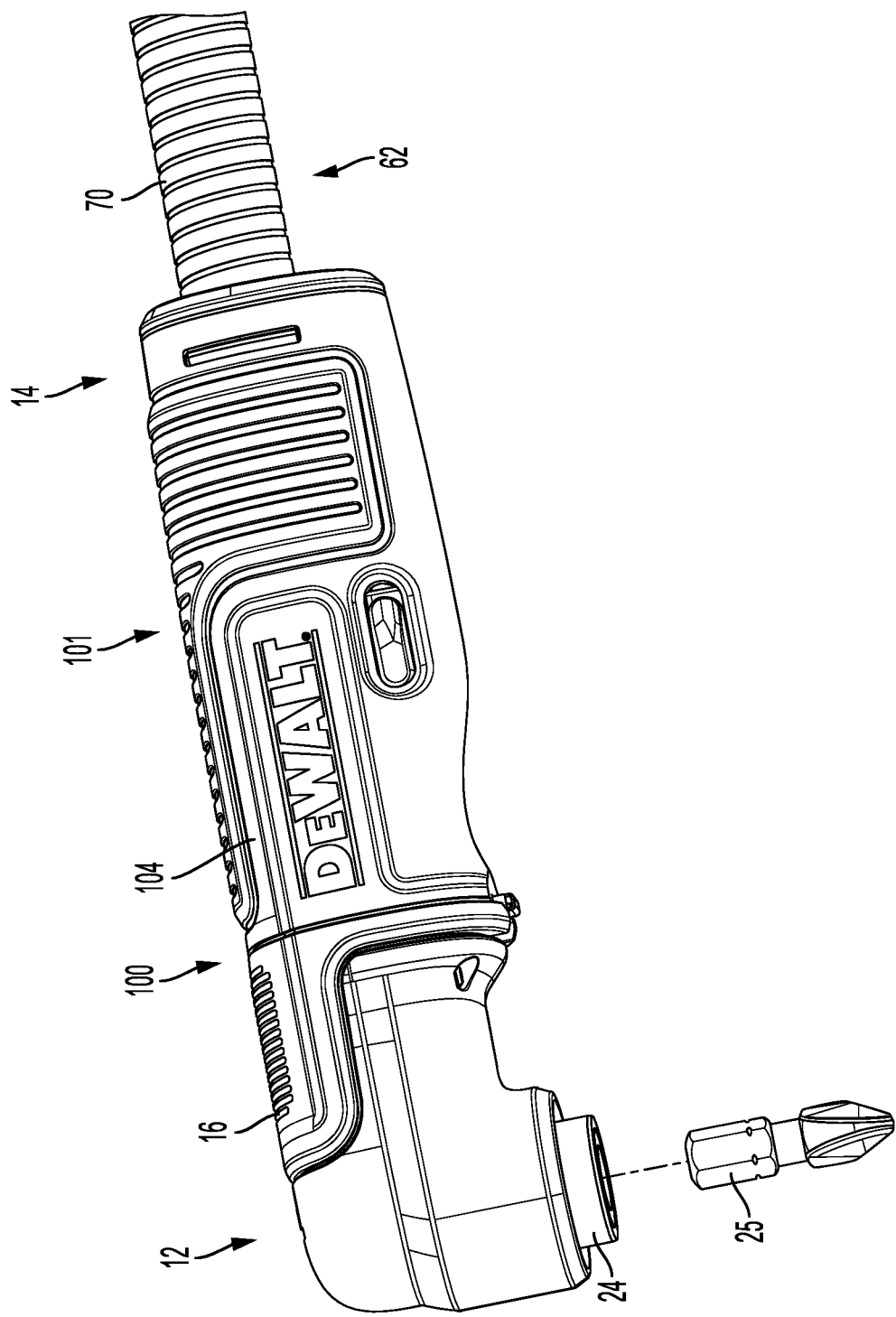
Figure 9B:
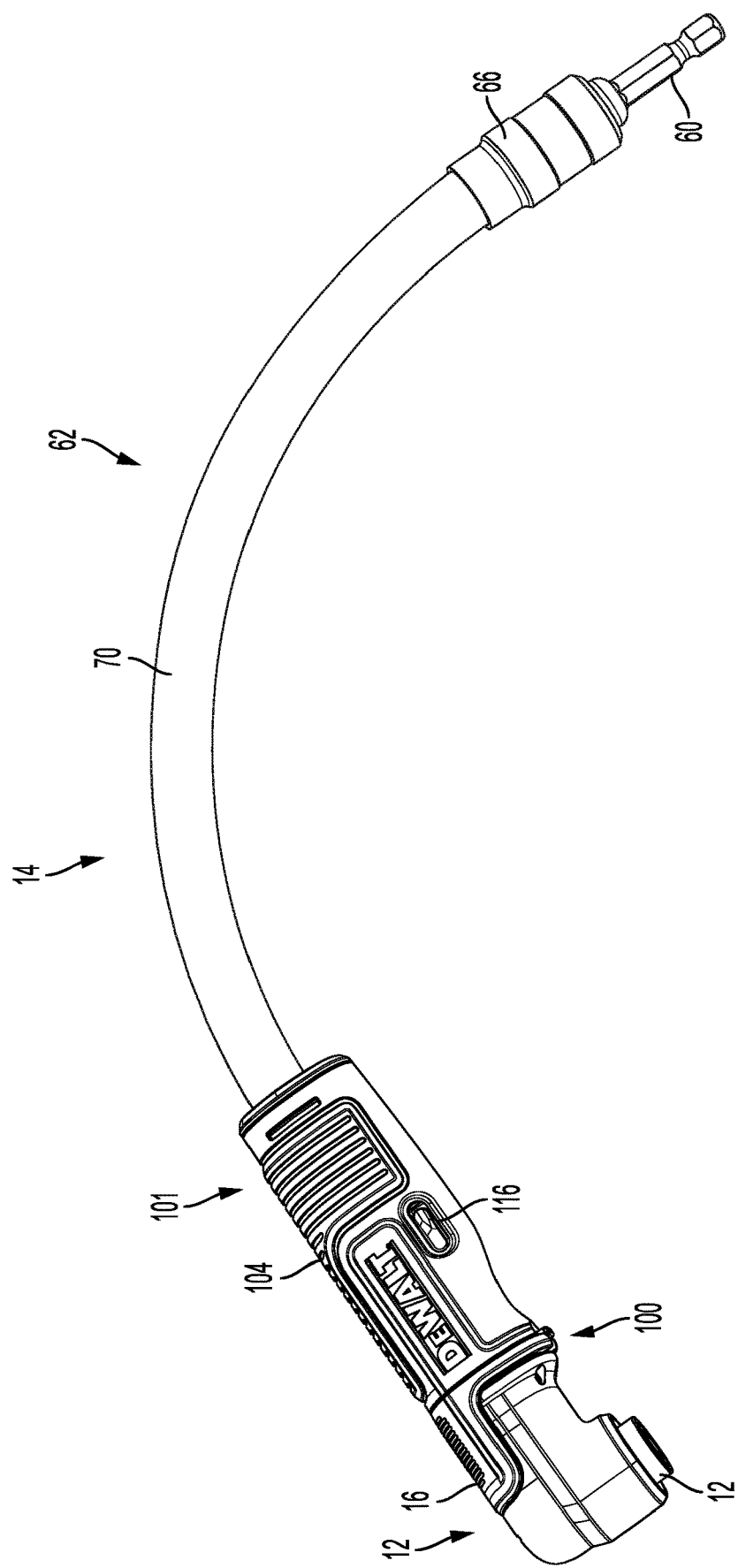
Figure 10A:
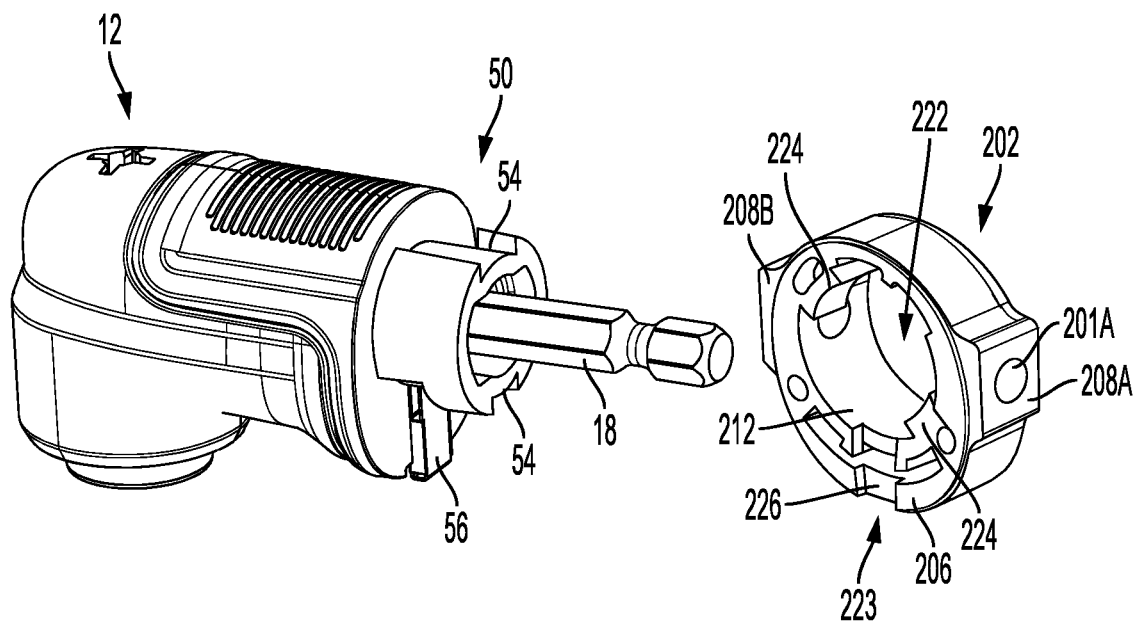
FIG. 10A is a perspective view of the angle tool bit holder of FIG. 2A with a removable collar.
Figure 10B:
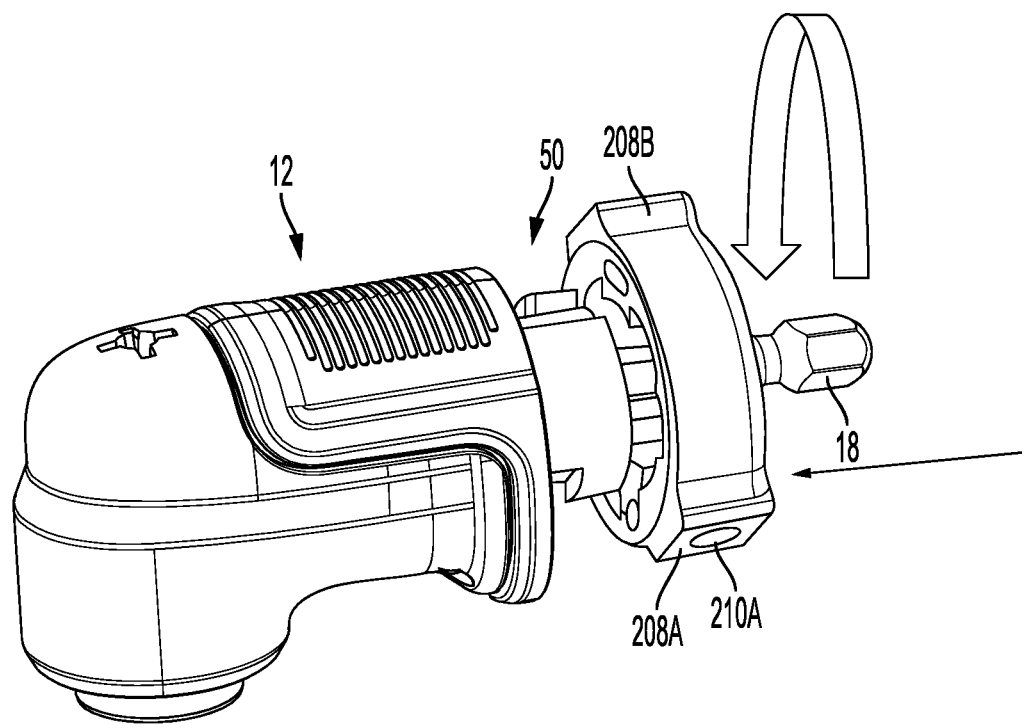
FIG. 10B is a perspective view of the collar of FIG. 10A being coupled to the angle tool bit holder.
Figure 10C:
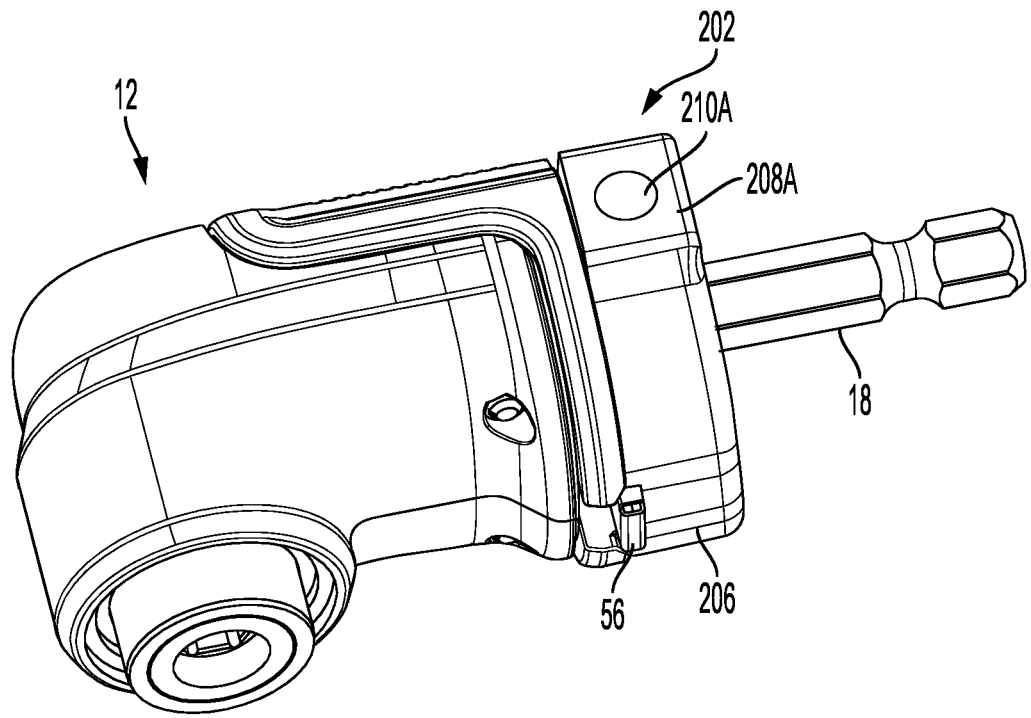
FIG. 10C is a perspective view of the angle tool bit holder and collar of FIG. 10A coupled to one another.
Figure 10D:
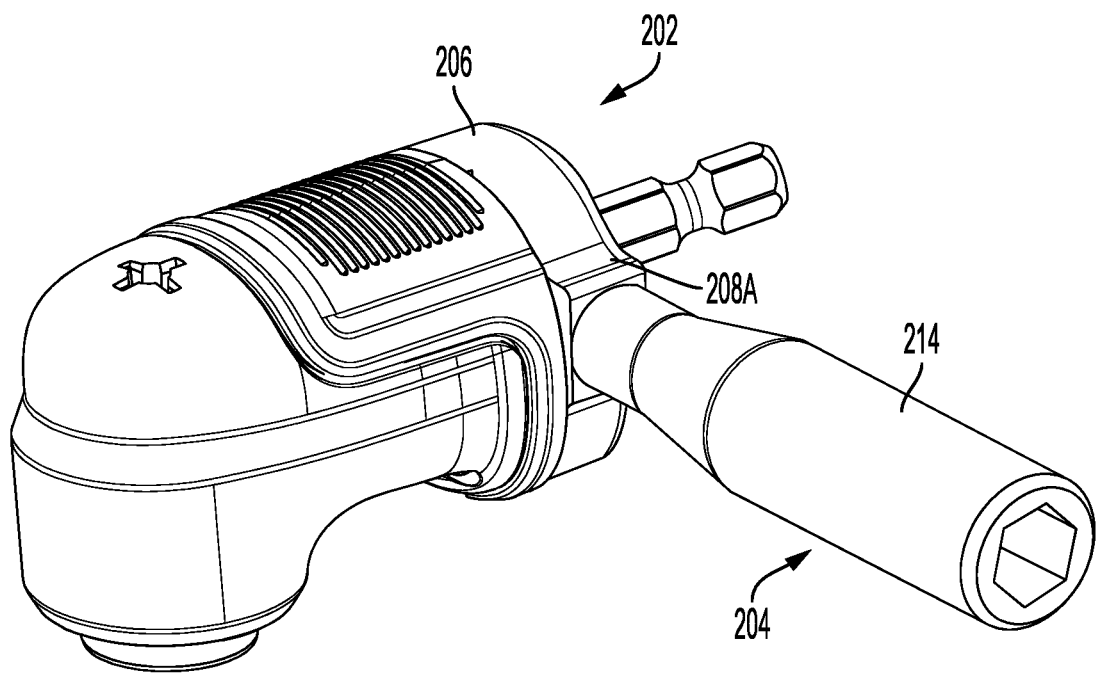
FIG. 10D is a perspective view of the angle tool bit holder and collar of FIG. 10A with a side handle coupled to the collar.
Figure 10E:
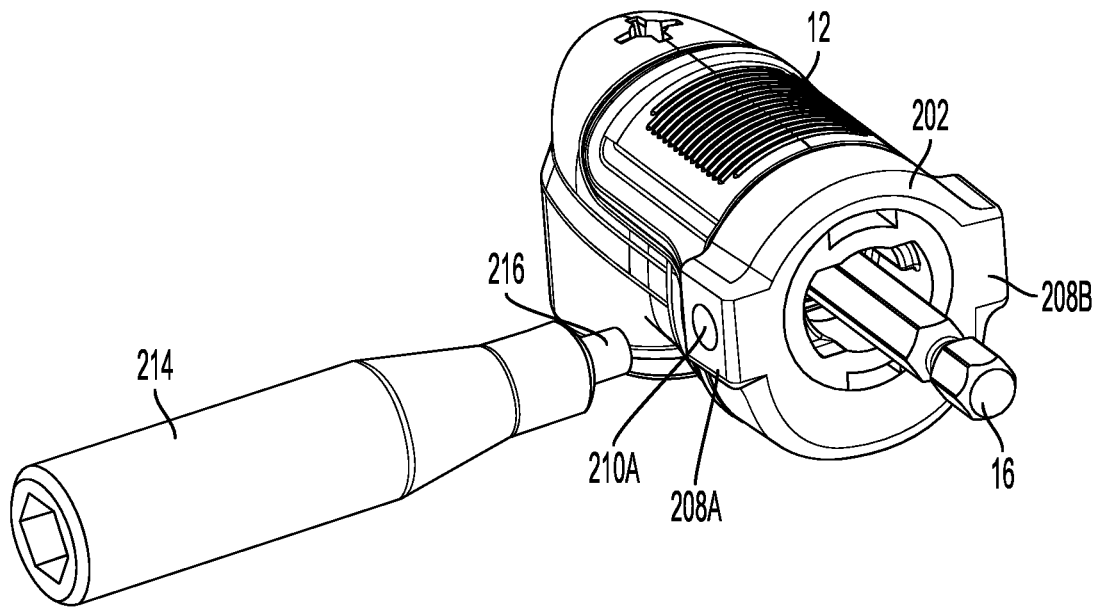
FIGS. 10E and 10F are perspective views of the side handle of FIG. 10D being coupled to opposing lateral side of the collar.
Figure 10F:
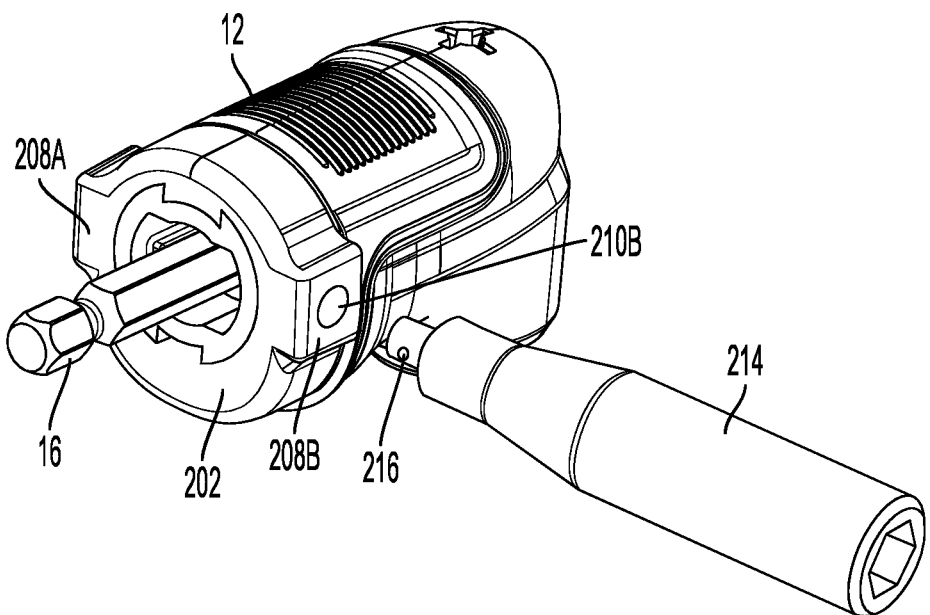

Referring to FIGS. 8A-9B, the system 10 is operable in a third configuration with the angle tool bit holder 12 and the flexible shaft tool bit holder 14 used in combination to drive a third tool bit 25 received by the first tool bit holder 24. The first input shaft 18 is inserted into and retained in the second tool bit holder 64 along arrow A1 (FIG. 8A). The lock button 116 is depressed and the sleeve 104 is moved axially forward along arrow A2 so that the radial inward projections 124 engage and enter the L-shaped slots 54 (FIG. 8B). When sleeve 104 reaches its forwardmost position, the sleeve 104 is twisted clockwise along arrow A3 so that the projections 124 engage the bases of the L-shaped slots 54 and the tab 56 on the housing 16 engages the circumferential recess 126 (FIGS. 8C-8D). The second input shaft 60 is configured to be received in a rotatable output member 7 (e.g., a chuck or quick release bit holder) of a rotary power tool 5 (e.g., a drill, an impact driver, or a screwdriver). The flexible shaft assembly 62 may be bent into a variety of straight, curved, and curvilinear configurations (FIGS. 9 and 10). Rotational torque from the power tool is transmitted to the second tool bit 25 via the second input shaft 60, the flexible intermediate shaft 72, the second tool bit holder 64, the first input shaft, the first angle gear 20, the second angle gear 22, and the first tool bit holder 24. Meanwhile, the first engagement structure 50 and the second engagement structure 122 inhibit radial and axial movement of the flexible shaft tool bit holder 14 relative to the housing 16 of the angle tool bit holder 12. In particular, because the sleeve 104 is non-rotatably coupled to the collar 102, which is non-rotatably coupled to the front bushing 68, the sleeve 104 inhibits rotational movement of the front bushing 68, the flexible sheath 70, and the rear bushing 66 of the flexible intermediate assembly 62 relative to the housing 16 of the angle tool bit holder 12. This helps inhibit vibration and/or whipping of the flexible shaft tool bit holder 14 while the tool bit 25 held by the angle tool bit holder 12 is being driven by a power tool coupled to the second input shaft 60 of the flexible shaft tool bit holder 14. To remove the flexible shaft tool bit holder 14 from the angle tool bit holder 12, the tab 56 is pushed axially against the force of the spring 58 and the steps are performed in reverse.

In other embodiments, the sleeve is non-rotatably received over the housing of the angle tool bit holder, and moveable axially relative to the angle tool bit holder between a forward position and a rearward position in which a first engagement structure on the sleeve engages a second engagement structure on the flexible shaft tool bit holder to non-rotatably and axially couple the angle tool bit holder to the flexible shaft tool bit holder. In yet other embodiments, the sleeve is not permanently coupled to either the angle bit holder or the flexible shaft tool bit holder and has first and second engagement structures to engage third and fourth engagement structures on the angle bit holder and the flexible shaft tool bit holder, respectively, to non-rotatably and axially couple the angle bit holder and the flexible shaft tool bit holder to one another. In yet other embodiments the first and/or second engagement structures may comprise other types of engagement structures and connectors that axially and non-rotatably couple two structures to one another, such as snap-fit connectors, latches, threaded connectors, magnetic connectors, plug connectors, quick-release connectors, and collet-type connectors.

Referring to FIGS. 10A-10F, in another embodiment, the modular tool bit holder system 10 may further include a collar 202 and a side handle 204 configured to be removably coupled to the first engagement structure 50 on the angle tool bit holder 12 when the angle tool bit holder 12 is operable in the first configuration. The collar 202 includes an annular body 206 with a pair of diametrically opposed lateral ears 208A, 208B, each including a threaded bore 210A, 210B. An interior wall 212 of the collar 202 includes a third engagement structure 222 to non-rotatably and axially engage the first engagement structure 50 on the angle tool bit holder 12. For example, the second engagement structure 222 may include a bayonet-type connection 223 comprising at least one (e.g., two diametrically opposed) radial inward projections 224 configured to engage the L-shaped slots 54 on the housing 16 of the angle tool bit holder 12. The interior wall 212 of the collar 202 may further include a circumferential recess 226 configured to be engaged by the radially extending tab 56 on the housing 16 of the angle tool bit holder 12. To couple the collar 202 to the angle tool bit holder 12, the collar 202 is moved axially forward over the input shaft 18 until the radial inward projections 224 engage and enter the L-shaped slots 54. When the collar 202 reaches its forwardmost position, the collar 202 is twisted clockwise so that the projections 124 engage the bases of the L-shaped slots 54 and the tab 56 on the housing 16 engages the circumferential recess 126. The collar 202 helps protect a user's hand from being injured by sharp edges on the first engagement structure 50 on the angle tool bit holder 12 when the angle tool bit holder 12 is operated in the first configuration.

The side handle 204 includes a handgrip 214 and a threaded bolt 216. The side handle 204 can be removably coupled to either lateral side of the collar 202 by threading the threaded bolt 216 into one of the threaded bores 210A, 210B in the ears 208A, 208B on lateral sides of the collar 202. The side handle 204 provides a more secure hand grip for inhibiting rotation of the housing 16 of the angle tool bit holder 12 when the angle tool bit holder is operated in the first configuration.

Figure 11:
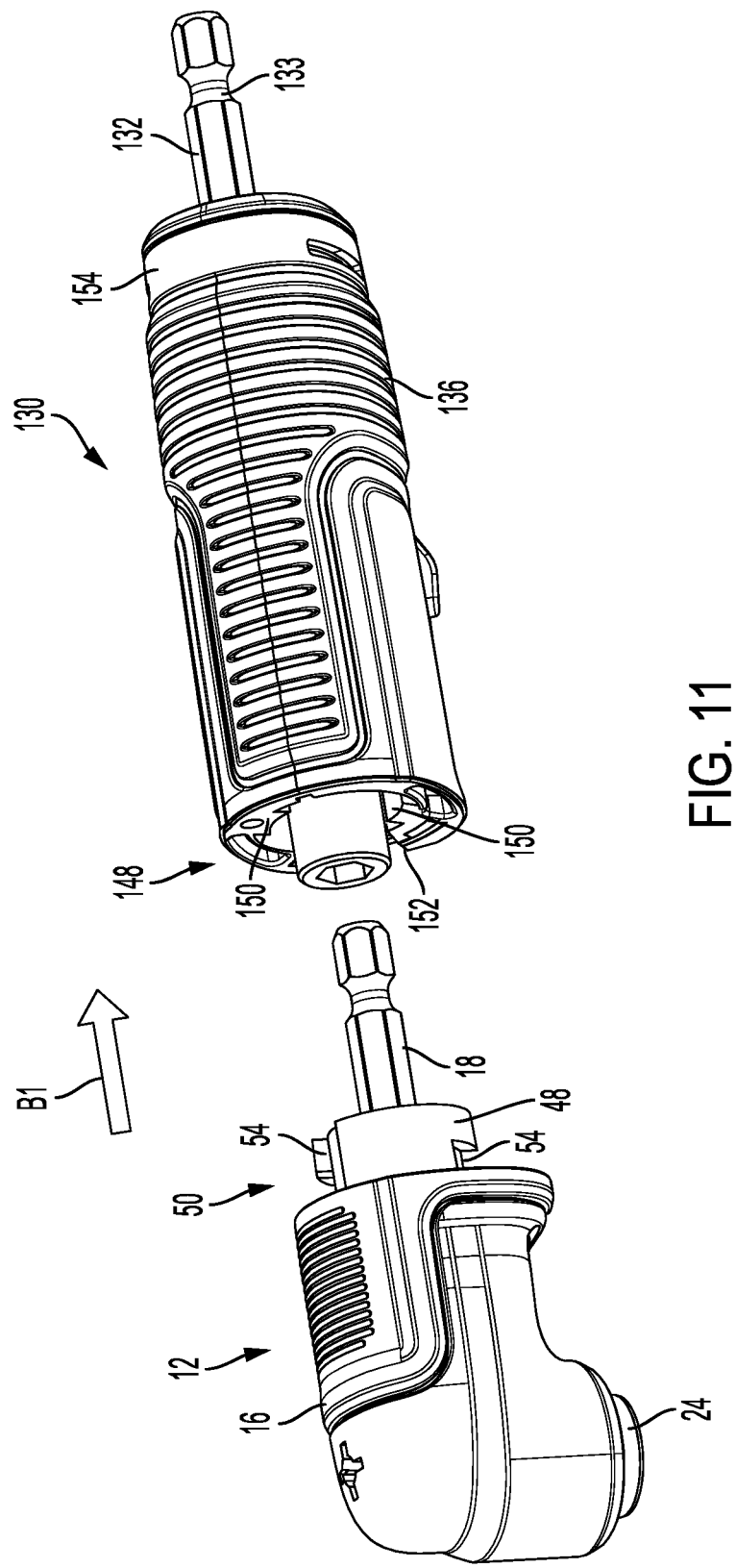
FIG. 11 is a perspective view of the angle tool bit holder and a handle extension of the tool bit holder system.
Figure 12A:
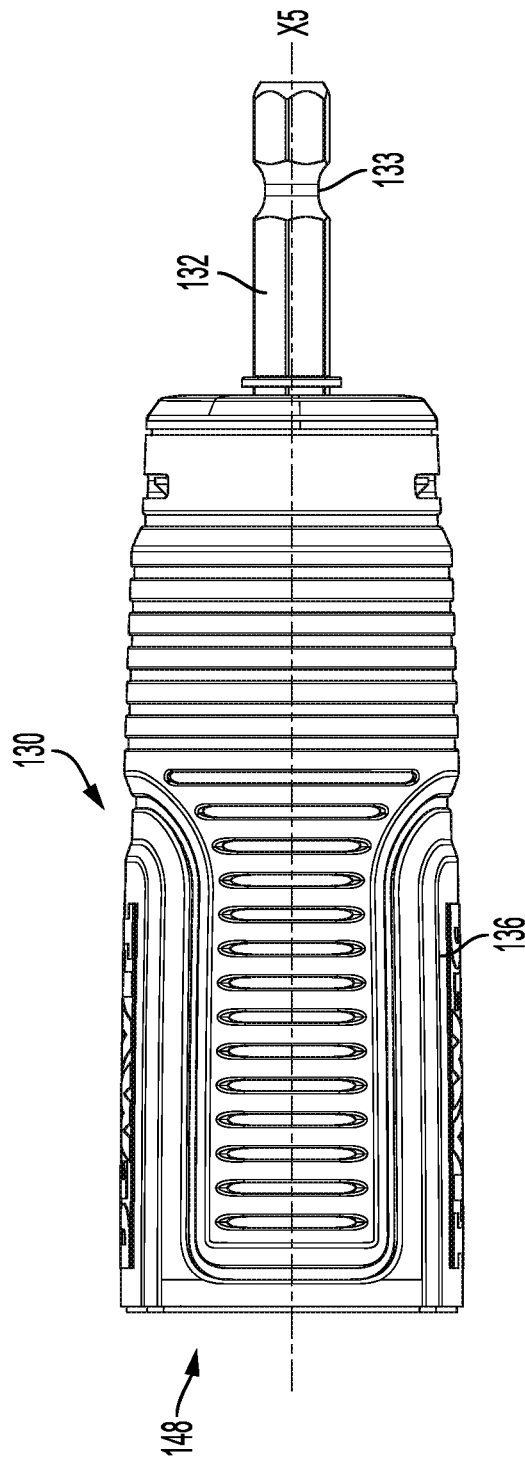
FIG. 12A is a side view of the handle extension of FIG. 11.
Figure 12B:
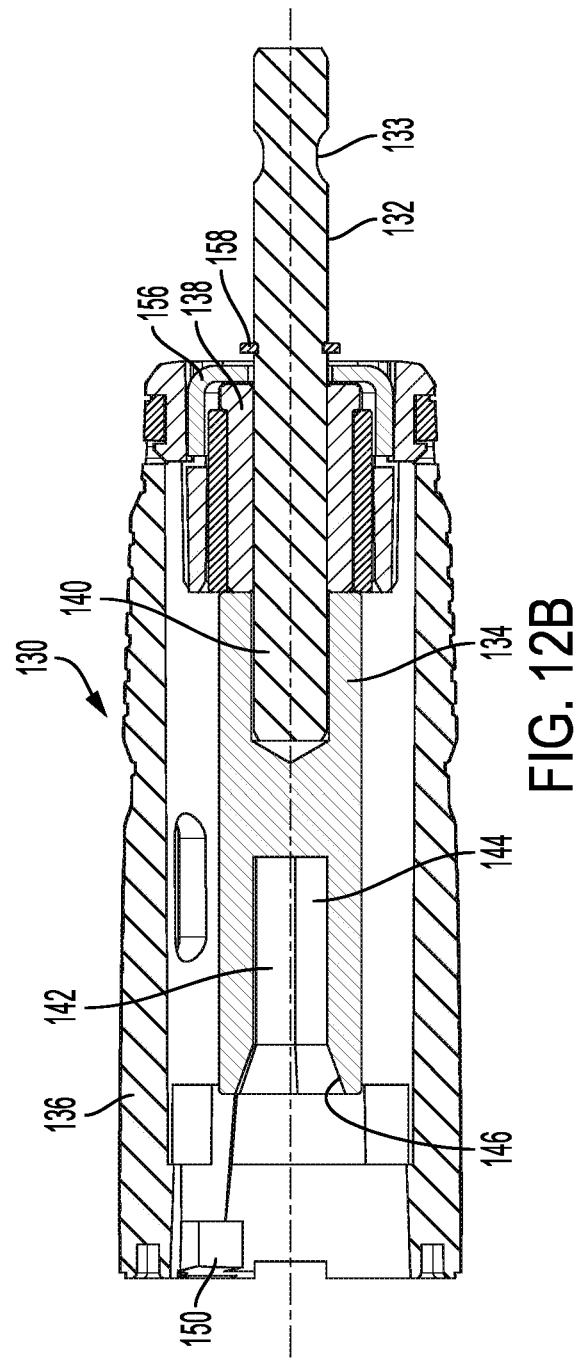
FIG. 12B is a cross sectional view of the handle extension of FIG. 11.

Referring also to FIGS. 11-12B, in another embodiment, the modular tool bit holder system 10 may further include an extension handle 130 usable in combination with the angle tool bit holder 12 in a fourth configuration. The extension handle 130 includes a third input shaft 132 rotatably drivable about a fifth axis X5, a third output shaft 134 fixedly coupled to and rotatably drivable by the third input shaft 132 about the fifth axis X5, and a generally cylindrical handgrip 136 received at least partially over the third input shaft 132 and the third output shaft 134. The third input shaft 132 may comprise a polygonal (e.g., hexagonal) shaft with a ball groove 133 supported for rotation in the handgrip 136 by a bearing 138. The third input shaft 132 may extend rearward from the handgrip 136 along the fifth axis X5 for coupling to an output of a rotary power tool. The third output shaft 134 may include a rear bore 140 that fixedly receives the third input shaft (e.g., in a slip fit or press fit configuration) and a front bore 142. The front bore 142 may have a polygonal (e.g., hexagonal) closed rear end portion 144 and flared open front end portion 146 and be configured to receive the first input shaft 18 of the angle tool bit holder 12.

The handgrip 136 has a third engagement structure 148 at its front end configured to engage the first engagement structure 50 on the housing 14 of the angle tool bit holder 12 to non-rotatably and axially couple the extension handle 130 to the angled tool bit holder 12 when used in the fourth configuration. The third engagement structure 148 may include a bayonet-type connection in the form of at least one (e.g., two diametrically opposed) radial inward projections 150 configured to engage the L-shaped slots 54 on the housing 16. The third engagement structure 148 may also include a circumferential recess 152 configured to be engaged by the tab 56 on the housing 16. A rear end 154 of the handgrip 136 is axially retained on the third input shaft 132, and thus also on the third output shaft 134, e.g., by a retaining ring 156 and C-clip 158.

Figure 13C:
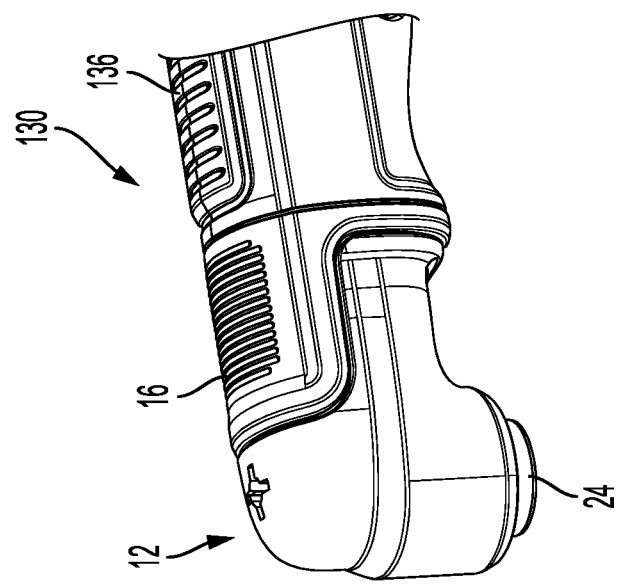
Figure 14A:
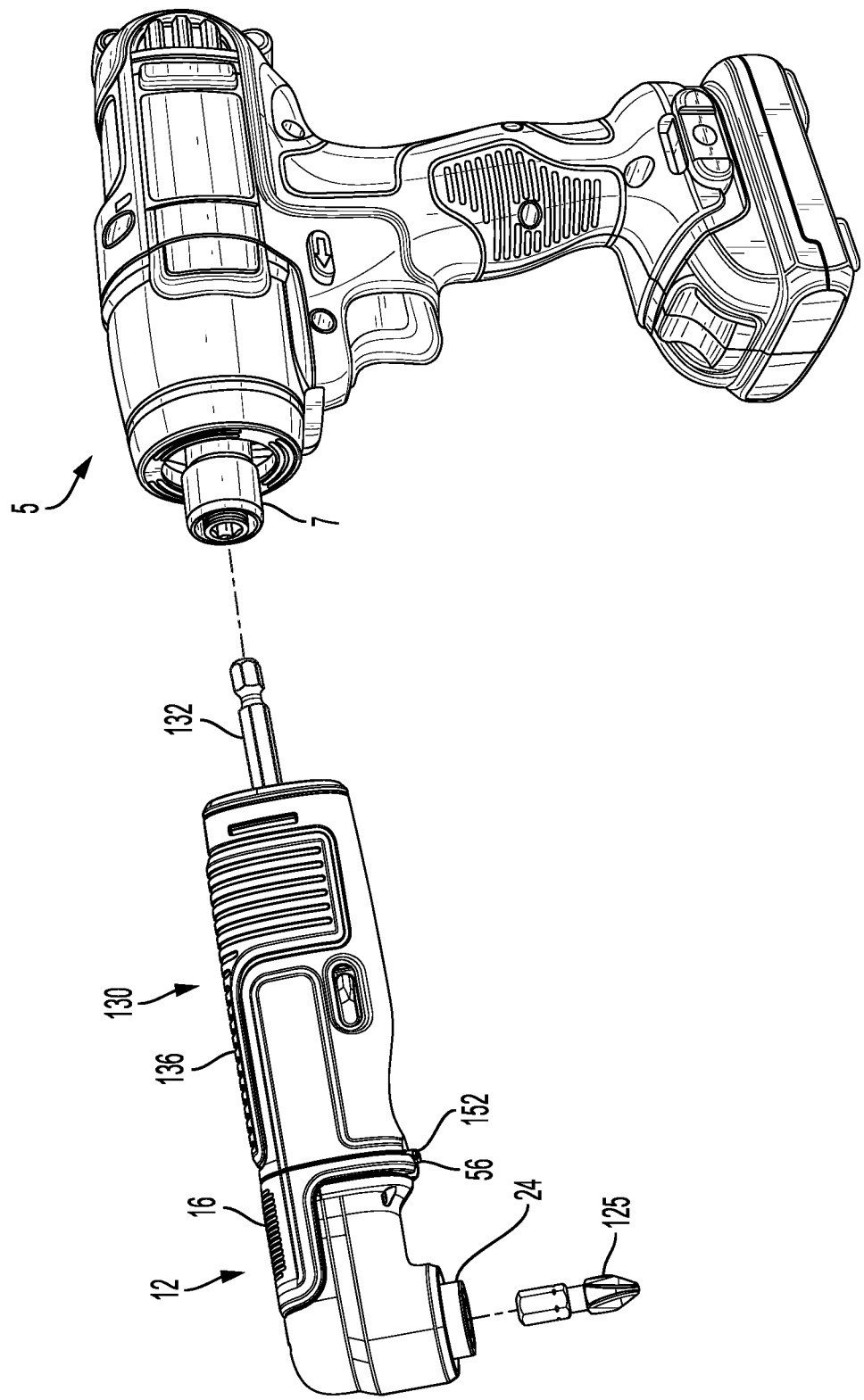
Figure 14B:
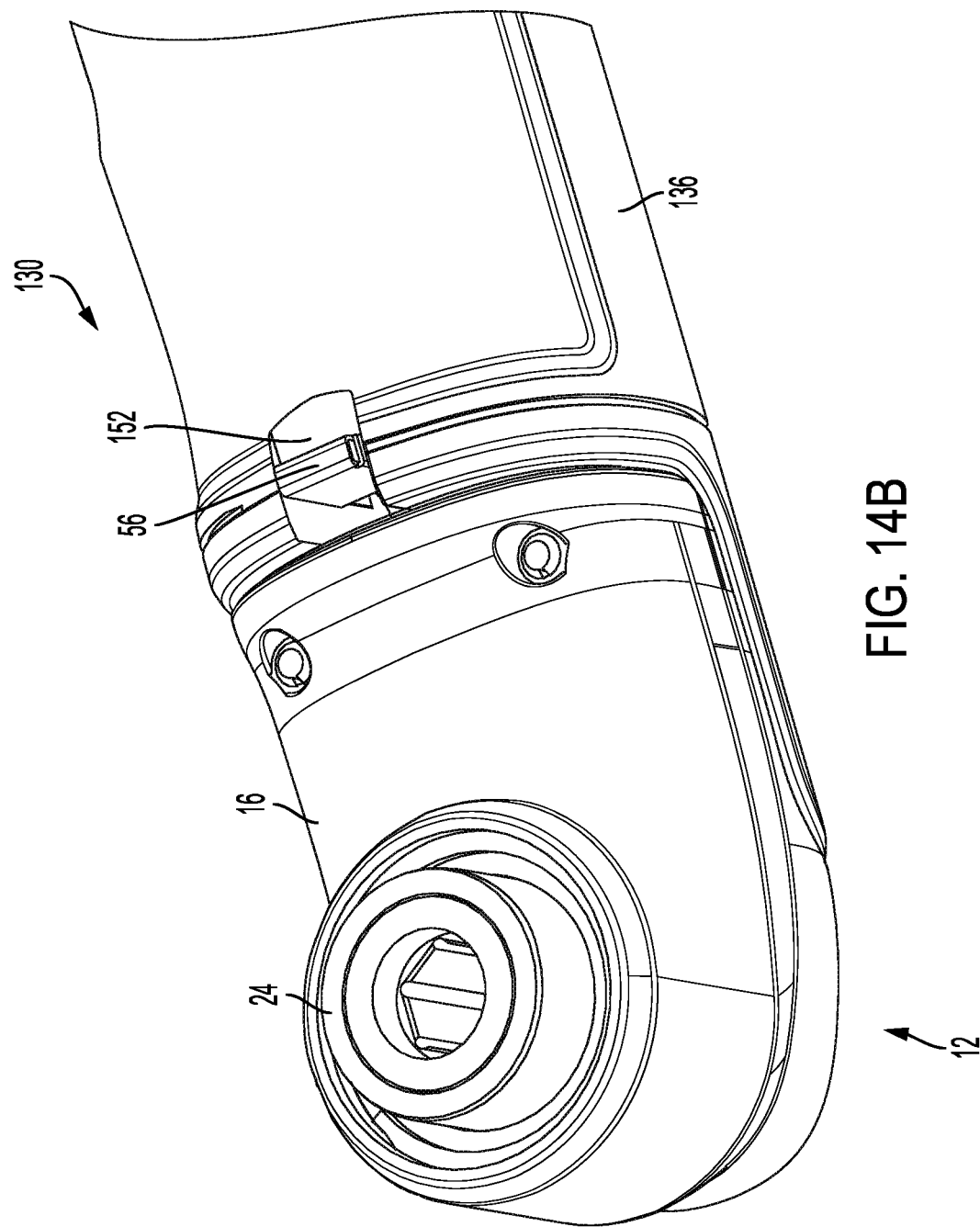

Referring also to FIGS. 13A-14B, when used in the fourth configuration, first, the first input shaft 18 is inserted into the front bore 142 in the third output shaft 134 along arrow B1 (FIG. 11). Second, the handgrip 136 is moved axially forward along arrow B2 so that the radial inward projections 150 engage and enter the L-shaped slots 54 (FIG. 13A). Third, when the handgrip 136 reaches its forwardmost position, it is twisted clockwise along arrow B3 so that the projections 150 engage the bases of the L-shaped slots 54 and the tab 56 on the housing 16 engages the circumferential recess 152 (FIGS. 13B-13C and 14B). A tool bit 125 may be inserted into the first bit holder 24 and the third input shaft 132 may be coupled to a power tool to drive the tool bit 125 (FIG. 14A). In this configuration, the third input shaft 132 is configured to be received in a rotatable output member 7 (e.g., a chuck or quick release bit holder) of a rotary power tool 5 (e.g., a drill, an impact driver, or a screwdriver). Rotational output from the power tool is transmitted to the tool bit 125 via the third input shaft 132, the third output shaft 134, the first input shaft 18, the first angle gear 20, the second angle gear 22, and the first tool bit holder 24. Meanwhile, the projections 150 and the L-shaped slots 54 and the tab 56 and the circumferential recess 152 together inhibit radial and axial movement of the handgrip 136 relative to the housing 16. To remove the handle extension 130 from the housing 16, the tab 56 is pushed axially against the force of the spring 58 and the steps are performed in reverse.

Figure 15:
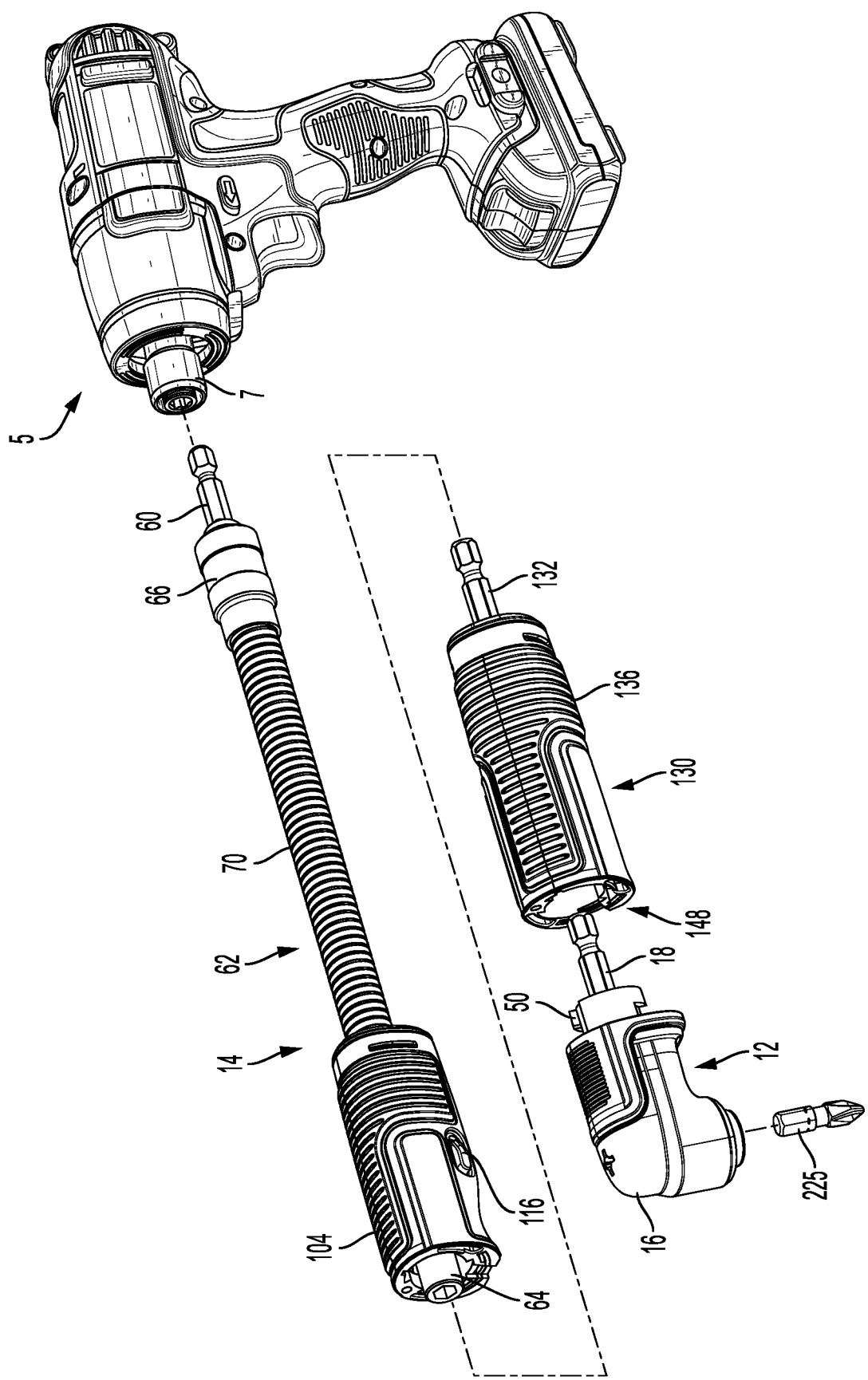
FIG. 15 is a perspective of the flexible shaft tool bit holder, the handle extension, and the angle tool bit holder, showing operation of the system in a fifth configuration.

Referring also to FIG. 15, in another embodiment, the angle tool bit holder 16, the flexible shaft tool bit holder 14, and the handle extension 130 are usable together in a fifth configuration. In this configuration, the first input shaft 16 of the angle bit holder 12 may be received in the bore 142 in third output shaft 134 of the handle extension 130, and the handgrip 136 may be coupled to the housing 16, as described above with respect to the fourth configuration. The third input shaft 132 of the handle extension 130 may be received in the socket 80 of the flexible shaft tool bit holder 14 and the second input shaft 60 of the flexible shaft tool bit holder 14 may be coupled to the output of a rotary power tool. A tool bit 225 may be inserted into the first bit holder 24. In this configuration, the second input shaft 60 is configured to be received in a rotatable output member 7 (e.g., a chuck or quick release bit holder) of a rotary power tool 5 (e.g., a drill, an impact driver, or a screwdriver). Rotational output from a power tool is transmitted to the tool bit 225 via the second input shaft 60, the flexible intermediate shaft 72, the second tool bit holder 64, the third input shaft 132, the third output shaft 134, the first input shaft 18, the first angle gear 20, the second angle gear 22, and the first tool bit holder 24. Meanwhile, the projections 150 and the L-shaped slots 54 and the tab 56 and the circumferential recess 152 together inhibit radial and axial movement of the handgrip 136 relative to the housing 16. To separate the flexible shaft tool bit holder 14, the handle extension 130, and the angle tool bit holder 12, the tab 56 is pushed axially against the force of the spring 58 and the steps are performed in reverse.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A modular tool bit holder system comprising:
a fixed orientation tool bit holder including a housing, a first connector fixedly coupled to the housing, a first input member rotatably drivable about a first axis relative to the housing, and a first tool bit holder rotatably drivable relative to the housing about a second axis; and
a flexible orientation tool bit holder including a handle portion, a second connector fixedly coupled to the handle, a second input member rotatable relative to the handle portion, a flexible intermediate shaft bendable into a plurality of configurations and rotatably drivable by the second input member relative to the handle portion, and a second tool bit holder rotatably drivable relative to the handle portion by the intermediate shaft,
wherein the system is operable in each of (a) a first configuration in which the fixed orientation tool bit holder is operable without the flexible orientation tool bit holder by coupling the first input member to a rotatable output member of a power tool and operating the power tool to rotatably drive the first input member and the first tool bit holder, (b) a second configuration in which the flexible orientation tool bit holder is operable without the fixed orientation tool bit holder by coupling the second input member to a rotatable output member of a power tool and operating the power tool to rotatably drive the second input member and the second tool bit holder, and (c) a third configuration in which the fixed orientation tool bit holder and the flexible orientation tool bit holder are operable in combination by coupling the first input shaft to the second tool bit holder, non-rotatably and axially stationarily coupling the handle portion to the housing by coupling the first connector and the second connector, coupling the second input shaft to a rotatable output member of a power tool, and operating the power tool to rotatably drive the second input member, the flexible intermediate shaft, the second tool bit holder, the first input member, and the first tool bit holder.

2. The modular tool bit holder system of claim 1, wherein the handle portion includes a sleeve moveable axially between a rearward position in which the sleeve is not engageable with the housing and a forward position in which the sleeve is engageable with the housing.

3. The modular tool bit holder system of claim 2, wherein the sleeve further comprises a lock configured to retain the sleeve in at least one of the rearward position and the forward position.

4. The modular tool bit holder system of claim 2, where, in the rearward position, the sleeve exposes the second tool bit holder and, in the forward position, the sleeve at least partially covers the second tool bit holder.

5. The modular tool bit holder system of claim 1, wherein the first connector comprises a first bayonet connector and the second connector comprises a second bayonet connector.

6. The modular tool bit holder system of claim 1, wherein the flexible tool bit holder comprises a non-rotating flexible sheath that receives the flexible shaft and that is non-rotatably coupled to the handle portion.

7. The modular tool bit holder system of claim 1, further comprising a collar non-rotatably coupleable to the housing of the fixed orientation tool bit holder and a side handle removably coupleable to the collar.

8. The modular tool bit holder system of claim 1, further comprising an extension handle including a grip, a third input member, and a third output member rotatable upon rotation of the third input member, and wherein the system is operable in a fourth configuration by coupling the first input member to the third output member, non-rotatably coupling the grip to the housing, coupling the third input member to a rotatable output member of a power tool, and operating the power tool to rotatably drive the third input member and transmit torque to the first output member via the third output member and the first input member while the housing and the grip are held rotationally stationary relative to one another.

9. The modular tool bit holder system of claim 8, wherein the system is operable in a fifth configuration by coupling the first input member to the second tool bit holder, non-rotatably coupling the sleeve to the housing, coupling the second input member to the third output member, coupling the third input member to a rotatable output member of a power tool, and operating the power tool to rotatably drive the third input member and transmit torque to the first output member via the third output member, the second input member, the flexible shaft, the second output member, and the first input member, while the sleeve is non-rotatably coupled to the housing.

10. A method of operating a tool bit holder system comprising:
coupling a first input member of a fixed orientation tool bit holder to a rotatable output member of a power tool, coupling a tool bit to a first tool bit holder of the fixed orientation tool bit holder, and operating the power tool to rotatably drive the first input member about a first axis and the first tool bit holder about a second axis relative to a housing of the fixed orientation tool bit holder;
coupling a second input member of a flexible orientation tool bit holder to a rotatable output member of a power tool, coupling a tool bit to a second tool bit holder of the flexible orientation tool bit holder, bending a flexible intermediate shaft disposed between the second input member and the second tool bit holder to orient the second tool bit holder in a desired orientation relative to the second input shaft, and operating the power tool to rotatably drive the second input member and transmit torque to the second tool bit holder via the flexible intermediate shaft, the second tool bit holder rotatable relative to a handle coupled to the flexible orientation tool bit holder; and
coupling the first input shaft to the second tool bit holder, non-rotatably and axially stationarily coupling the handle portion to the housing by coupling a first connector that is fixedly coupled to the housing and a second connector that is fixedly coupled to the handle, coupling the second input shaft to a rotatable output member of a power tool, coupling a tool bit to the first tool bit holder, and operating the power tool to rotatably drive the second input member and transmit torque to the first tool bit holder via the second tool bit holder, the first input shaft, and the flexible intermediate shaft, which is bent into a desired orientation.

11. The method of claim 10, wherein coupling the handle portion to the housing includes moving a sleeve axially between a rearward position in which the sleeve is not engageable with the housing and a forward position in which the sleeve is engageable with the housing.

12. The method of claim 11, further comprising actuating a lock coupled to the sleeve to retain the sleeve in at least one of the rearward position and the forward position.

13. The method of claim 11, where, in the rearward position, the sleeve exposes the second tool bit holder and, in the forward position, the sleeve at least partially covers the second tool bit holder.

14. The method of claim 10, wherein the first connector comprises a first bayonet connector and the second connector comprises a second bayonet connector.

15. The method of claim 10, wherein the flexible tool bit holder comprises a non-rotating flexible sheath that receives the flexible shaft and that is non-rotatably coupled to the handle portion.

16. The method of claim 10, further comprising non-rotatably coupling a collar to the housing and removably coupling a side handle to the collar.

17. The method of claim 10, further comprising coupling a third input member of an extension handle to a rotatable output member of a power tool, coupling the first input member to a third output member of the extension handle, non-rotatably coupling a grip of the extension handle to the housing, and operating the power tool to rotatably drive the third input member and transmit torque to the first output member via the third output member and the first input member while the housing and the grip are held rotationally stationary relative to one another.

18. The method of claim 17, further comprising coupling the first input member to the second tool bit holder, non-rotatably coupling the sleeve to the housing, coupling the second input member to the third output member, coupling the third input member to a rotatable output member of a power tool, and operating the power tool to rotatably drive the third input member and transmit torque to the first output member via the third output member, the second input member, the flexible shaft, the second output member, and the first input member, while the sleeve is non-rotatably coupled to the housing.

* * * * *